United States Patent
Akula et al.

(10) Patent No.: US 10,554,448 B2
(45) Date of Patent: Feb. 4, 2020

(54) DYNAMIC SCHEDULING OF DATA PATTERNS FOR SHORTENED TRANSMISSION TIME INTERVALS

(71) Applicant: QUALCOMM Incorporated, San Diego, CA (US)

(72) Inventors: Prashanth Akula, Lake Bluff, IL (US); Seyedkianoush Hosseini, San Diego, CA (US); Young Geun Cho, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/058,648

(22) Filed: Aug. 8, 2018

(65) Prior Publication Data
US 2019/0052483 A1    Feb. 14, 2019

Related U.S. Application Data

(60) Provisional application No. 62/543,881, filed on Aug. 10, 2017.

(51) Int. Cl.
*H04L 25/02* (2006.01)
*H04L 5/00* (2006.01)
(Continued)

(52) U.S. Cl.
CPC ........ *H04L 25/0224* (2013.01); *H04L 5/0048* (2013.01); *H04L 27/2649* (2013.01);
(Continued)

(58) Field of Classification Search
CPC .............. H04L 1/0025; H04L 25/0224; H04L 27/2649; H04L 5/0044; H04L 5/0048;
(Continued)

(56) References Cited

U.S. PATENT DOCUMENTS

2013/0100935 A1* 4/2013 Zhou ................ H04W 72/082
                                                           370/335
2018/0183552 A1* 6/2018 Hosseini ............ H04L 5/0048
(Continued)

OTHER PUBLICATIONS

Ericsson: "Performance Implication of UL On/Off Time Mask on sTTI Operation," 3GPP Draft; R4-1703840 Performance Implication of STTI Operation on UL On/Off Time Mask, 3rd Generation Partnership Project (3GPP), Mobile Competence Centre; 650, Route Des Lucioles; F-06921 Sophia-A, vol. RAN WG1, No. Spokane, Washington, USA; Apr. 3, 2017-Apr. 7, 2017, Apr. 3, 2017, XP051246967, 11 pages, Retrieved from the Internet: URL: http://www.3gpp.org/ftp/Meetings_3GPP_SYNC/RAN4/Docs/ [retrieved on Apr. 3, 2017].
(Continued)

*Primary Examiner* — Robert J Lopata
(74) *Attorney, Agent, or Firm* — Holland & Hart LLP

(57) ABSTRACT

Methods, systems, and devices for wireless communication are described. Multiple transmission time intervals (TTIs) may be used for communications between a base station and user equipment (UE), where each TTI may have a data pattern scheduled by a base station. Each TTI may include respective symbol periods designated as reference or data symbol periods. In some examples, the UE may be configured to transmit a sounding reference signal (SRS) in a last symbol period of a TTI, and a base station may dynamically determine a data pattern for the TTI such that a temporally last symbol period is immediately preceded by a reference symbol period (e.g., based on the presence of the SRS). In such cases, the UE may configure a transient time within the preceding reference symbol period to avoid signal degradation of the SRS (or data transmitted within the same TTI).

30 Claims, 17 Drawing Sheets

(51) Int. Cl.
  *H04L 27/26* (2006.01)
  *H04W 16/14* (2009.01)
  *H04W 16/28* (2009.01)
  *H04W 72/12* (2009.01)
  *H04W 72/14* (2009.01)
(52) U.S. Cl.
  CPC .......... *H04W 16/14* (2013.01); *H04W 16/28* (2013.01); *H04W 72/1268* (2013.01); *H04W 72/14* (2013.01)
(58) Field of Classification Search
  CPC ..... H04L 5/0051; H04L 5/0053; H04L 5/006; H04L 5/0082; H04L 5/0096; H04W 16/14; H04W 16/28; H04W 72/1268; H04W 72/14
  USPC ......................................................... 370/329
  See application file for complete search history.

(56) References Cited

U.S. PATENT DOCUMENTS

| | | | |
|---|---|---|---|
| 2018/0199322 A1* | 7/2018 | Takeda | H04J 11/00 |
| 2019/0081722 A1* | 3/2019 | Takeda | H04W 72/0446 |
| 2019/0174515 A1* | 6/2019 | Li | H04L 5/001 |
| 2019/0190763 A1* | 6/2019 | Takeda | H04L 5/0053 |
| 2019/0222390 A1* | 7/2019 | Su | H04L 5/0048 |

OTHER PUBLICATIONS

Ericsson: "UE ON/OFF Mask," 3GPP Draft; R4-1704839 ON-OFF Mask, 3rd Generation Partnership Project (3GPP), Mobile Competence Centre; 650, Route Des Lucioles; F-06921 Sophia-Antipolis Cedex; France, vol. RAN WG4, No. Hangzhou, China; May 15, 2017-May 19, 2017, May 14, 2017, XP051277032, 9 pages, Retrieved from the Internet: URL: http://www.3gpp.org/ftp/Meetings_3GPP_SYNC/RAN4/Docs/ [retrieved on May 14, 2017].
International Search Report and Written Opinion—PCT/US2018/045959—ISA/EPO—Nov. 20, 2018 (175590WO).
NTT DOCOMO, et al: "Flexible UL DMRS Position for 2-symbol sTTI", 3GPP Draft; R1-1708412, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017, XP051273605, 8 pages, Retrieved from the Internet: URL: http://www.3gpp.org/ftp/Meetings_3GPP_SYNC/RAN1/Docs/ [retrieved on May 14, 2017].

* cited by examiner

DYNAMIC SCHEDULING OF DATA PATTERNS FOR SHORTENED TRANSMISSION TIME INTERVALS

CROSS REFERENCES

The present application for patent claims the benefit of U.S. Provisional Patent Application No. 62/543,881 by AKULA, et al., entitled "DYNAMIC SCHEDULING OF DATA PATTERNS FOR SHORTENED TRANSMISSION TIME INTERVALS," filed Aug. 10, 2017, assigned to the assignee hereof, and expressly incorporated by reference herein.

BACKGROUND

The following relates generally to wireless communication, and more specifically to dynamic scheduling of data patterns for shortened transmission time intervals (TTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, UEs and base stations may communicate using TTIs having various lengths. For example, a base station and UE may be configured to communicate using a short TTI (sTTI) having a reduced duration with respect to other TTIs (e.g., 1 ms TTIs). The base station may allocate transmission resources for sTTIs to the UE, which may include resources for data, control information, and reference signals transmitted during a number of symbol periods during each sTTI. Accordingly, the base station may use techniques for organizing the resources in respective symbol periods to enhance communications efficiency and throughput within the system.

SUMMARY

The described techniques relate to improved methods, systems, devices, or apparatuses that support periodic grants for dynamic scheduling of data patterns for shortened transmission time intervals. Generally, the described techniques provide for data patterns that enable the transmission of data and a sounding reference signal (SRS) such that signal degradation from a transient period is minimized. For example, a base station may identify a data pattern for a sequence of symbol periods (e.g., orthogonal frequency-division multiplexing (OFDM) symbol periods) for data and reference signal transmissions during multiple transmission time intervals (TTIs) (e.g., comprising a subframe). Accordingly, respective symbol periods within each of the multiple TTIs may be designated as data or reference symbol periods. In such cases, a temporally last symbol period of a subframe may be used for the transmission of SRS by the user equipment (UE).

The base station may configure a data pattern for SRS transmission such that the temporally last symbol period carrying SRS is immediately preceded by a reference symbol period. In such cases, when transmitting the SRS, the UE may configure a transient time that is included (or the majority of the transient time is included) within the boundaries of the reference symbol period that precedes the SRS. As a result of the transient time configuration, the transmission of data and SRS within the same TTI may be preserved (e.g., throughput degradation and high block error ratio (BLER) may be avoided). In some cases, the base station may dynamically determine the data pattern based on the whether the UE will be transmitting SRS. For example, the base station may schedule either a reference symbol period or a data symbol period immediately preceding the temporally last symbol period of the TTI based on whether SRS is to be transmitted by the UE. Thus, the base station may flexibly configure data patterns based on the signals transmitted during a given TTI.

A method of wireless communication is described. The method may include identifying a data pattern indicating a sequence of OFDM data symbol periods and OFDM reference symbol periods to span a plurality of TTIs in an uplink transmission, a temporally last symbol period of the data pattern being immediately preceded by a reference symbol period, receiving a configuration to transmit a SRS, and transmitting, to a base station, the SRS during the temporally last symbol period of the uplink transmission and in accordance with the identified data pattern such that the SRS is immediately preceded by the reference symbol period.

An apparatus for wireless communication is described. The apparatus may include means for identifying a data pattern indicating a sequence of OFDM data symbol periods and OFDM reference symbol periods to span a plurality of TTIs in an uplink transmission, a temporally last symbol period of the data pattern being immediately preceded by a reference symbol period, means for receiving a configuration to transmit a SRS, and means for transmitting, to a base station, the SRS during the temporally last symbol period of the uplink transmission and in accordance with the identified data pattern such that the SRS is immediately preceded by the reference symbol period.

Another apparatus for wireless communication is described. The apparatus may include a processor, memory in electronic communication with the processor, and instructions stored in the memory. The instructions may be operable to cause the processor to identify a data pattern indicating a sequence of OFDM data symbol periods and OFDM reference symbol periods to span a plurality of TTIs in an uplink transmission, a temporally last symbol period of the data pattern being immediately preceded by a reference symbol period, receive a configuration to transmit a SRS, and transmit, to a base station, the SRS during the temporally last symbol period of the uplink transmission and in accordance with the identified data pattern such that the SRS is immediately preceded by the reference symbol period.

A non-transitory computer readable medium for wireless communication is described. The non-transitory computer-readable medium may include instructions operable to cause a processor to identify a data pattern indicating a sequence of OFDM data symbol periods and OFDM reference symbol periods to span a plurality of TTIs in an uplink transmission, a temporally last symbol period of the data pattern being immediately preceded by a reference symbol period, receive a configuration to transmit a SRS, and transmit, to a base station, the SRS during the temporally last symbol period of the uplink transmission and in accordance with the identified data pattern such that the SRS is immediately preceded by the reference symbol period.

Some examples of the method, apparatus, and non-transitory computer-readable medium described above may further include processes, features, means, or instructions for configuring a transient period preceding the SRS so that at least a majority of the transient period may be within the reference symbol period. Some examples of the method, apparatus, and non-transitory computer-readable medium described above may further include processes, features, means, or instructions for transmitting a reference signal during the reference symbol period that includes the configured transient period.

In some examples of the method, apparatus, and non-transitory computer-readable medium described above, the reference signal comprises a demodulation reference signal (DMRS). Some examples of the method, apparatus, and non-transitory computer-readable medium described above may further include processes, features, means, or instructions for receiving, in an uplink grant from the base station, an indication of the data pattern, wherein identifying the data pattern may be based on the received indication.

In some examples of the method, apparatus, and non-transitory computer-readable medium described above, the temporally last symbol period and the reference symbol period may be part of a three-symbol TTI. In some examples of the method, apparatus, and non-transitory computer-readable medium described above, a temporally first symbol period of the three-symbol TTI may be one of a data symbol period or a reference symbol period. In some examples of the method, apparatus, and non-transitory computer-readable medium described above, the three-symbol TTI is a short TTI (sTTI) having a first duration that may be less than a second duration of a second TTI. In some examples of the method, apparatus, and non-transitory computer readable medium described above, the three-symbol TTI is an sTTI5 in a fourteen-symbol data pattern.

A method of wireless communication is described. The method may include determining a data pattern indicating a sequence of OFDM data symbol periods and OFDM reference symbol periods to span a plurality of TTIs in an uplink transmission, a temporally last symbol period of the data pattern being immediately preceded by a reference symbol period, configuring a UE to transmit a SRS, and receiving, from the UE, the SRS during the temporally last symbol period of the uplink transmission and in accordance with the identified data pattern such that the SRS is immediately preceded by the reference symbol period.

An apparatus for wireless communication is described. The apparatus may include means for determining a data pattern indicating a sequence of OFDM data symbol periods and OFDM reference symbol periods to span a plurality of TTIs in an uplink transmission, a temporally last symbol period of the data pattern being immediately preceded by a reference symbol period, means for configuring a UE to transmit a SRS, and means for receiving, from the UE, the SRS during the temporally last symbol period of the uplink transmission and in accordance with the identified data pattern such that the SRS is immediately preceded by the reference symbol period.

Another apparatus for wireless communication is described. The apparatus may include a processor, memory in electronic communication with the processor, and instructions stored in the memory. The instructions may be operable to cause the processor to determine a data pattern indicating a sequence of OFDM data symbol periods and OFDM reference symbol periods to span a plurality of TTIs in an uplink transmission, a temporally last symbol period of the data pattern being immediately preceded by a reference symbol period, configure a UE to transmit a SRS, and receive, from the UE, the SRS during the temporally last symbol period of the uplink transmission and in accordance with the identified data pattern such that the SRS is immediately preceded by the reference symbol period.

A non-transitory computer readable medium for wireless communication is described. The non-transitory computer-readable medium may include instructions operable to cause a processor to determine a data pattern indicating a sequence of OFDM data symbol periods and OFDM reference symbol periods to span a plurality of TTIs in an uplink transmission, a temporally last symbol period of the data pattern being immediately preceded by a reference symbol period, configure a UE to transmit a SRS, and receive, from the UE, the SRS during the temporally last symbol period of the uplink transmission and in accordance with the identified data pattern such that the SRS is immediately preceded by the reference symbol period.

Some examples of the method, apparatus, and non-transitory computer-readable medium described above may further include processes, features, means, or instructions for dynamically determining whether the UE may be to transmit the SRS. Some examples of the method, apparatus, and non-transitory computer-readable medium described above may further include processes, features, means, or instructions for scheduling the uplink transmission having the data pattern based at least in part on the dynamic determination.

Some examples of the method, apparatus, and non-transitory computer-readable medium described above may further include processes, features, means, or instructions for determining a second data pattern based at least in part on the dynamic determination, the second data pattern indicating a second sequence of OFDM data symbol periods and OFDM reference symbol periods to span the plurality of TTIs in the uplink transmission, a temporally last symbol period of the second data pattern being immediately preceded by a data symbol period. Some examples of the method, apparatus, and non-transitory computer-readable medium described above may further include processes, features, means, or instructions for scheduling the uplink transmission having the second data pattern.

Some examples of the method, apparatus, and non-transitory computer-readable medium described above may further include processes, features, means, or instructions for transmitting, in an uplink grant to the UE, an indication of the determined data pattern. In some examples of the method, apparatus, and non-transitory computer-readable medium described above, the temporally last symbol period and the reference symbol period may be part of a three-symbol TTI.

In some examples of the method, apparatus, and non-transitory computer-readable medium described above, a temporally first symbol period of the three-symbol TTI may be one of a data symbol period or a reference symbol period. In some examples of the method, apparatus, and non-transitory computer-readable medium described above, the three-symbol TTI is a sTTI having a first duration that may be less than a second duration of a second TTI. In some examples of the method, apparatus, and non-transitory computer readable medium described above, the three-symbol TTI is an sTTI5 in a fourteen-symbol data pattern.

DETAILED DESCRIPTION

Figure 1:
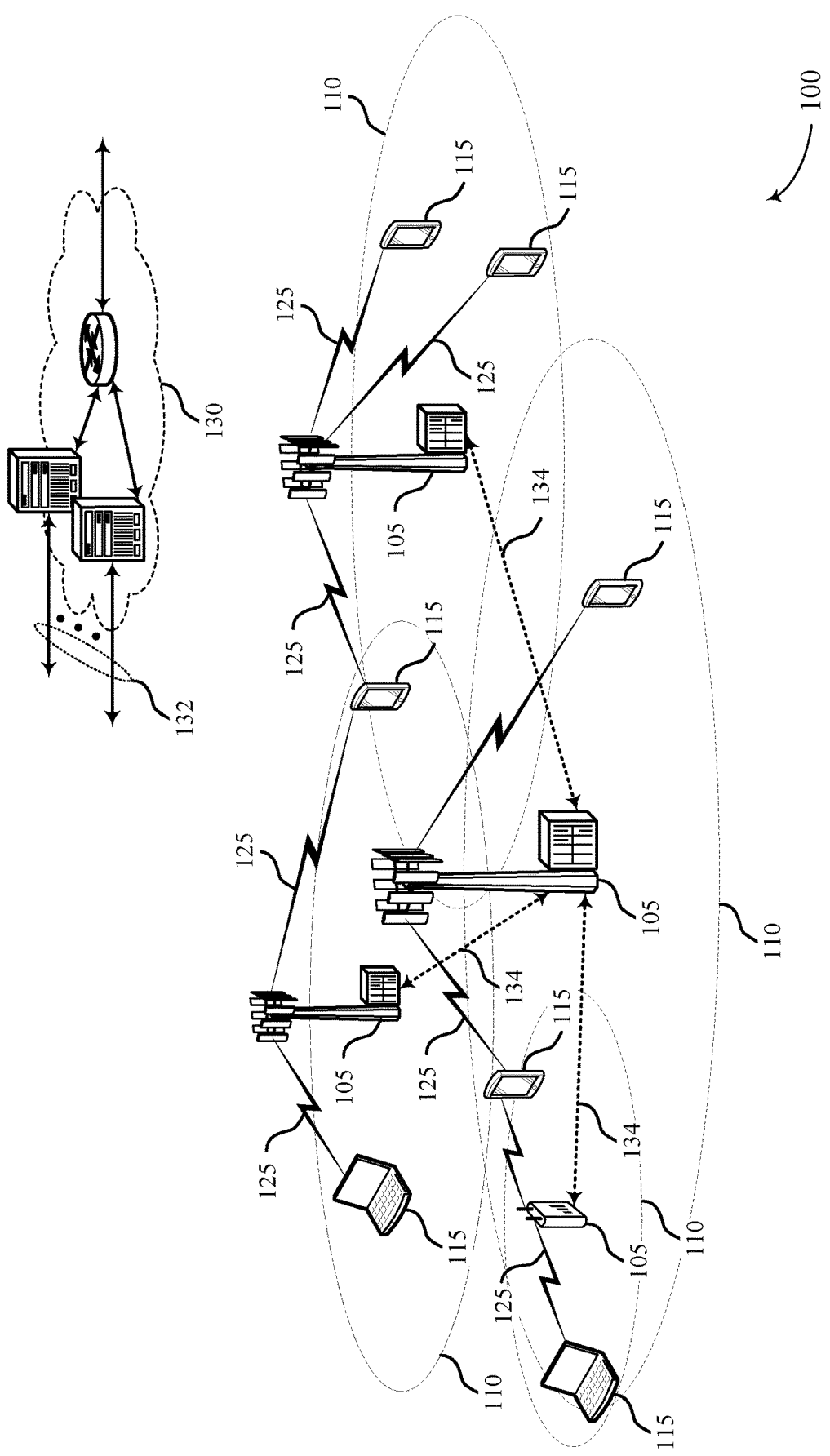
FIG. 1 illustrates an example of a system for wireless communication that supports dynamic scheduling of data patterns for shortened transmission time intervals (TTIs) in accordance with aspects of the present disclosure.

A base station may, in some examples, configure different transmission time intervals (TTIs) for communications with a user equipment (UE). For example, wireless communications in such systems may use TTIs having a first duration (e.g., a 1 ms TTI) in addition to a shortened or short TTI (sTTI) having a second, shorter, duration (e.g., two orthogonal frequency-division multiplexing (OFDM) symbol periods, three OFDM symbol periods, seven OFDM symbol periods, a slot, and the like). Wireless communications using such sTTIs may be associated with low latency between downlink and uplink transmissions.

Resources may be allocated for uplink and downlink transmissions using a data pattern for multiple sTTIs, and respective sTTIs (e.g., comprising a subframe) may each have a same or different data pattern for the transmission of, for example, data or reference signals. The base station may signal a chosen data pattern to a UE using an uplink grant scheduling uplink transmissions (e.g., physical uplink shared channel (PUSCH) or short PUSCH (sPUSCH) transmissions). In some examples, an sTTI may include two or three OFDM symbol periods, and a data pattern for that sTTI may indicate these symbol periods as reference symbol periods (e.g., OFDM symbol periods for the transmission of a reference signal, such as a demodulation reference signal (DMRS)) or data symbol periods (e.g., OFDM symbol periods for the transmission of data), or any combination thereof. A temporally last symbol period an sTTI in the data pattern (e.g., a temporally last sTTI) may also be utilized for the transmission of a sounding reference signal (SRS) by a UE.

Based on the configuration of the symbol period preceding the SRS, a transient period (e.g., a region during which transmission power and/or a resource allocation changes) may either be split between the preceding symbol period and the SRS or may be allocated within the preceding symbol period (e.g., with minimal or no overlap with the SRS symbol period). For example, if the symbol period preceding SRS includes a data signal, the transient period may be split between the data signal and the SRS. Alternatively, if the symbol period preceding SRS includes a reference signal, the transient period (or a majority of the transient period) may be allocated within the reference signal. However, when the transient period is split between data and SRS, transmission throughput may be reduced due to an increased block error ratio (BLER), as compared to when the transient period is configured within a reference symbol period alone. Accordingly, it may be desirable to use techniques that preserve the transmission of SRS and data within an sTTI to provide for efficient scheduling and communications.

As described herein, a base station may dynamically determine data patterns based on the presence of SRS within a TTI. For example, a base station may determine that a UE is to transmit SRS during a TTI, and the base station may configure a data pattern for the TTI including the SRS with a reference signal symbol period that immediately precedes the SRS symbol period. As described above, a transient period within this TTI may be configured within the preceding reference symbol period. Additionally, the TTI may include a data symbol period preceding the reference symbol period (e.g., such as when the TTI is a three-symbol sTTI). As a result, neither SRS or data within the TTI may be significantly affected by the transient period within the reference symbol period, thereby preventing throughput degradation of both data and SRS. Additionally, because the reference signal may be a known or predefined pattern, transmissions may not be affected (or only minimally affected) by any degradation in the reference signal caused by the transient period.

Aspects of the disclosure are initially described in the context of wireless communications systems. Examples of data patterns are then described. Aspects of the disclosure are further illustrated by and described with reference to apparatus diagrams, system diagrams, and flowcharts that relate to dynamic scheduling of data patterns for shortened transmission time intervals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may further support dynamic data patterns for sTTIs to enable robust transmissions of SRS and data.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

An SRS may be transmitted by a UE 115 using a predetermined sequence (e.g., a Zadoff-Chu sequence) so that a base station 105 may estimate the uplink channel quality. An SRS transmission may not be associated with transmission of data on another channel, and may be transmitted periodically on a wide bandwidth (e.g., a bandwidth including more subcarriers than are allocated for uplink data transmission). In some examples, an SRS may be scheduled on multiple antenna ports and still considered to be a single SRS transmission. An SRS transmission may be categorized as a Type 0 (periodically transmitted at equally spaced intervals) SRS or as a Type 1 (aperiodic) SRS. In either case, the base station 105 may control the timing of SRS transmissions by notifying the UE 115 of which TTIs (e.g., subframes) may support the transmission of the SRS. Additionally, a sounding period (e.g., 2 to 230 subframes) and an offset within the sounding period may be configured for the UE 115. As a result, the UE 115 may transmit the SRS when a subframe that supports SRS transmissions coincides with the configured sounding period. In some cases, the SRS may be transmitted during a temporally last OFDM symbol of the subframe or, in some cases, may be sent during an uplink portion of a special subframe. Data gathered by a base station 105 from an SRS may be used to inform the scheduling of uplink transmissions by the UE 115, such as frequency dependent transmissions. A base station 105 may also utilize an SRS to check timing alignment status and send time alignment commands to the UE 115.

A UE 115 may schedule transient periods (which may also be referred to as transient regions or time masks) for uplink transmissions to a base station 105. Transient periods may refer to regions in which transmission power and/or resource block (RB) allocation may change (i.e., frequency hopping). As an example, because SRS transmissions occur over a relatively wide bandwidth, juxtaposition of SRS and PUSCH transmissions may result in such transient regions. As further described below, transmissions that occur during such transient regions may be associated with a lower likelihood of successful reception.

In wireless communications system 100, a base station 105 may configure a data pattern that enables the transmission of data and SRS with minimal signal degradation of the data and SRS. For example, the base station 105 may identify a data pattern for a sequence of symbol periods (e.g., OFDM symbol periods) for data and reference signal transmissions that may be sent during multiple TTIs. Symbol periods within the multiple TTIs (e.g., comprising a subframe) may thus each be designated as data or reference symbol periods (e.g., including reference signals to enable coherent signal demodulation at the base station 105). In such cases, a temporally last symbol period of a temporally last TTI of the subframe may be used for the transmission of SRS by the UE 115. The base station 105 may schedule the data pattern for SRS transmission such that the temporally last symbol period carrying SRS is immediately preceded by a reference symbol period. In such cases, when transmitting the SRS, the UE 115 may configure a transient time that is included (or the majority of the transient time is included) within the boundaries of the reference symbol period preceding the SRS. As a result of the transient time configuration within the reference symbol period, the transmission of data and SRS within the same TTI may be preserved (e.g., prevent throughput degradation and maintain a low BLER). In some cases, the base station 105 may dynamically determine the data pattern based on the whether the UE 115 will be transmitting SRS. For example, the base station 105 may schedule either a reference symbol period or a data symbol period immediately preceding the temporally last symbol period of the TTI based on whether SRS is to be transmitted by the UE 115.

Thus, wireless communications system 100 may support efficient techniques for using data patterns with a reference signal (e.g., DMRS) that immediately precedes SRS for efficient communications. In cases where the data pattern includes a reference symbol period that precedes an SRS (instead of a data symbol preceding SRS), lower error rates in the transmission may be observed.

Figure 2:
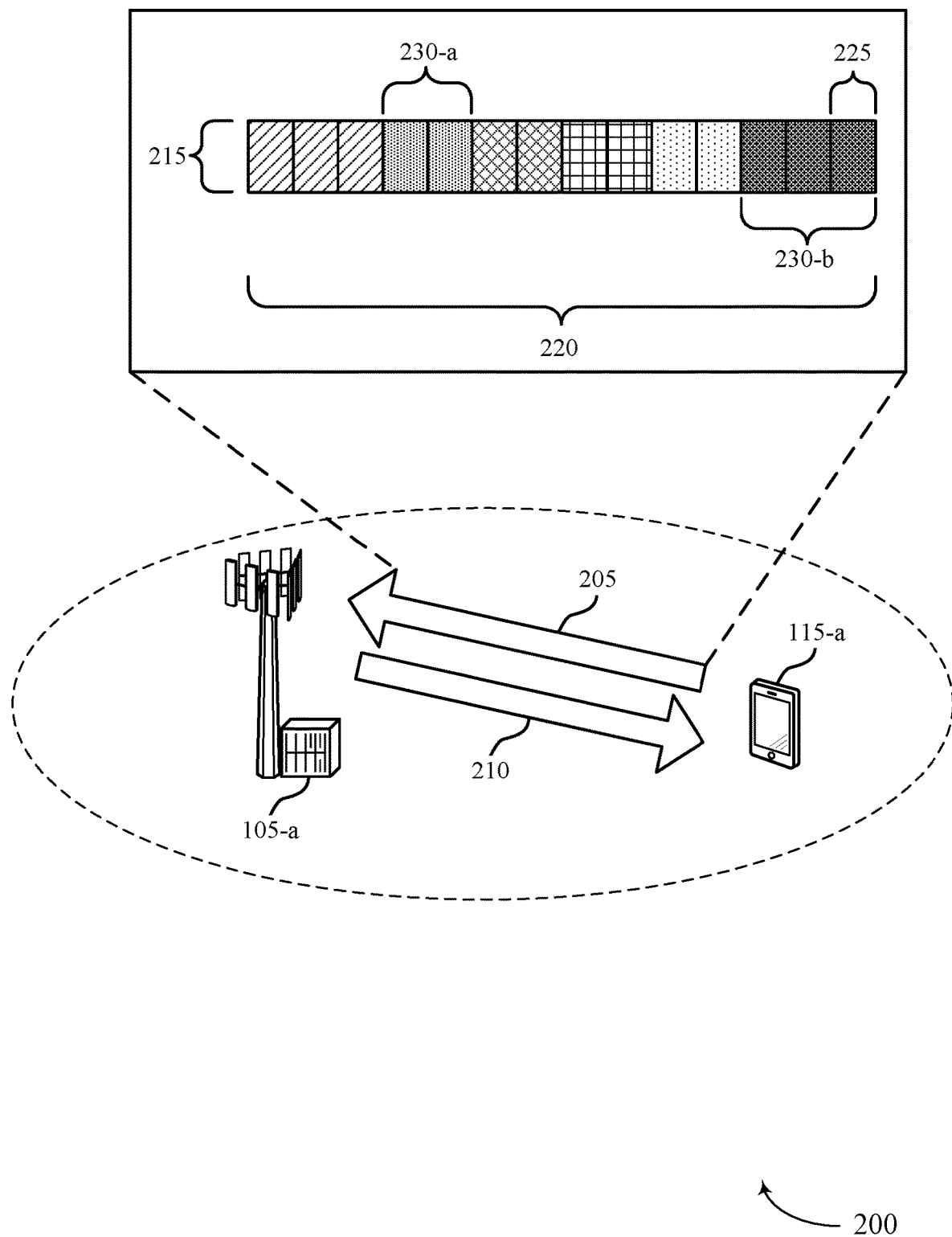
FIG. 2 illustrates an example of a wireless communications system that supports dynamic scheduling of data patterns for shortened TTIs in accordance with aspects of the present disclosure.

FIG. 2 illustrates an example of a wireless communications system 200 that supports dynamic scheduling of data patterns for sTTIs in accordance with various aspects of the present disclosure. In some examples, wireless communications system 200 may implement aspects of wireless communications system 100. For example, wireless communications system includes a base station 105-a and a UE 115-a, which may be examples of the corresponding devices described with reference to FIG. 1. Wireless communications system 200 may illustrate coherent scheduling of data patterns by base station 105-a based on the presence of SRS in an uplink transmission.

UE 115-a may send uplink transmissions to base station 105-a over uplink communications link 205. Similarly, base station 105-a may send downlink transmissions to UE 115-a over downlink communications link 210. In some cases, wireless communications system 200 may support different TTI configurations 215 for communications data sent over uplink communications link 205 and downlink communications link 210. For example, TTI configuration 215 may be an example of an allocation of time-frequency resources for communications between UE 115-a and base station 105-a over uplink communications link 205.

TTI configuration 215 may include various configurations for TTIs utilized for transmitting data, control information, and reference signals during a TTI 220 (e.g., a legacy TTI, a subframe, a 1 ms TTI, etc.) consisting of multiple (e.g., 14) OFDM symbol periods 225. TTI configuration 215 may include a configuration of multiple sTTIs 230, including, for example, sTTIs 230-a having a duration of two symbol periods 225 and sTTIs 230-b having a duration of three symbol periods 225. It is noted that an sTTI 230 described herein may be of any duration less than TTI 220, including the examples of the two-symbol and three-symbol sTTIs 230. Additionally, two-symbol and three-symbol sTTIs 230 may be configured in a different order or sequence than that illustrated by TTI configuration 215. In some examples, communications between UE 115-a and base station 105-b may utilize one or a combination of TTIs having different durations, where UE 115-a may be configured to use TTI 220, or sTTIs 230, or any combination thereof. In some cases, different TTI configurations 215 may be associated with different control format indicators (CFIs).

Base station 105-a may configure a data pattern for the set of sTTIs 230 within TTI 220. In such cases, respective sTTI 230 of the set may contain a pattern of reference signals (R) and data signals (D) for respective symbol periods 225. In some cases, the reference signals may include a DMRS. Base station 105-a may schedule a particular data pattern for UE 115-a to utilize for uplink transmissions (e.g., for data sent using an uplink shared channel, such as a shortened physical uplink shared channel (sPUSCH)), which may be signaled or indicated through an uplink grant transmitted over downlink communications link 210. Table 1 illustrates various data patterns that may be configured within a TTI 220 comprising a set of sTTIs 230.

TABLE 1

Data Patterns
Reference Signal Position Pattern Indicated
by a Uplink Grant Scheduling in sTTI n

| sTTI 0 | sTTI 1 | sTTI 2 | sTTI 3 | sTTI 4 | sTTI 5 |
|---|---|---|---|---|---|
| R D D | R D | R D | R D | R D | R D D |
| D D R | D R | D D | D R | D R | D R D |
|  | D D |  | D D\|R | D D |  |
|  | D D\|R |  |  | D D\|R |  |

Each sTTI of Table 1 may correspond to a respective sTTI included in TTI configuration 215. For instance, sTTI 0 may correspond to a temporally first sTTI 230 (such as a three-symbol sTTI 230-b), sTTI 1 may correspond to a temporally second sTTI 230 (such as a two-symbol sTTI 230-a), and so forth. As shown in Table 1, different sTTIs 230 may be configured with different durations and having different patterns of data and reference signals during respective symbol periods 225. For example, a data pattern of Table 1 indicating "D R" may correspond to a two-symbol sTTI 230-a having a temporally first symbol period 225 of the sTTI 230-a used for data and a temporally second symbol period 225 used for a reference signal.

In some cases, a temporally last symbol period 225 in sTTI 5 may be used for the transmission of an SRS by UE 115-a. UE 115-a may transmit the SRS to assist base station 105-a in measuring received signal power across a wide transmission bandwidth. Base station 105-a may use the information obtained from the SRS for frequency dependent scheduling. In some cases, UE 115-a may allocate a transient period relative to the presence of the SRS based on a preceding symbol period 225 of sTTI 5. The transient period may be associated with powering on or powering off a transmitter or transients associated with other transmissions. If a data transmission precedes the SRS, the transient period may be shared or symmetrically distributed between the SRS and data transmission. For instance, a first portion (e.g., half) of the transient period may be allocated within the data transmission and a second portion (e.g., a remaining half) of the transient period may be allocated within the SRS. Alternatively, if a reference signal transmission precedes the SRS, the transient period may, for example, be placed entirely within (or at least a majority of the transient period may be configured within) the symbol period 225 utilized for the reference signal transmission.

Various techniques discussed herein may be employed to prevent a transient period from interfering with the SRS and a preceding data signal. In some cases, the described techniques may allow for dynamic selection of transmission schemes (e.g., based on a MCS, a periodicity of the SRS transmission, etc.). For example, base station 105-a may configure a data pattern such that a reference signal is transmitted immediately preceding SRS. In such cases, the data pattern "D R D" shown in Table 1 may be used for sTTI 5 instead of the data pattern "R D D." The use of the "D R D" data pattern may ensure that UE 115-a configures a transient period within the reference symbol period which may prevent any degradation in the SRS and data transmissions within the same sTTI 230. Base station 105-a may thus coherently schedule the data pattern based on the presence of the SRS, where the data pattern "D R D" may be used when SRS is to be transmitted by UE 115-a, and the data pattern "R D D" may be used otherwise. Additionally, the techniques described herein may be applied to different data patterns and different TTI durations than those shown, which may likewise prevent or reduce throughput degradation in transmitted signals. For example, any data pattern that results in a reference signal being transmitted immediately preceding SRS may be used, including "R R D."

Figure 3A:
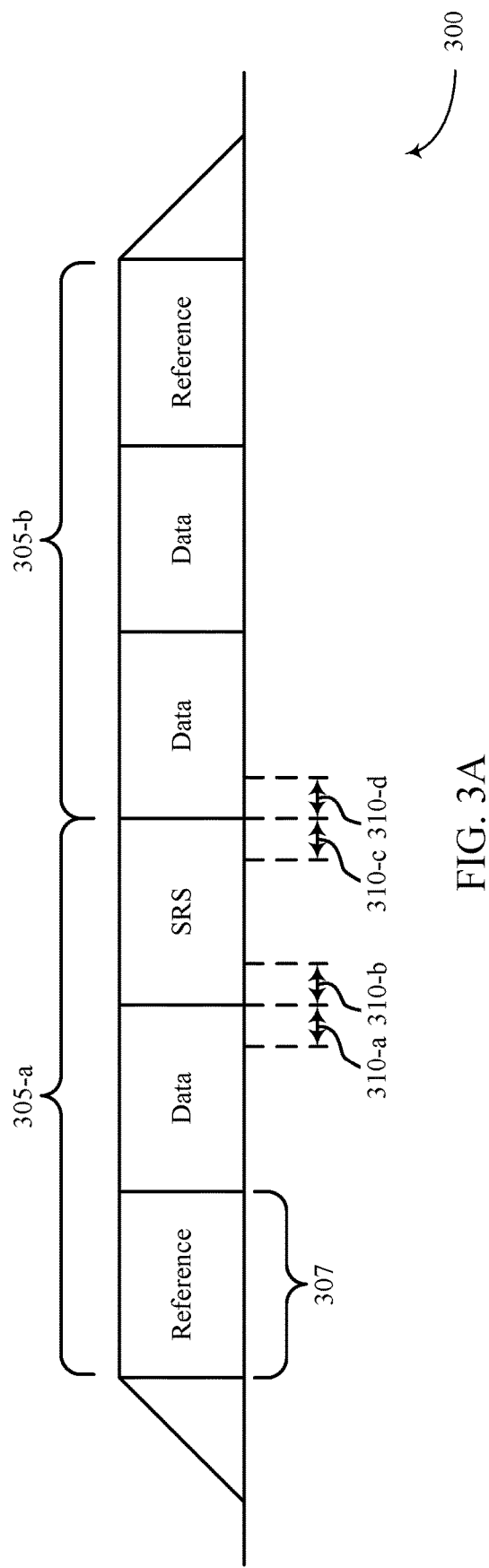
FIGS. 3A and 3B illustrate examples of data patterns in a system that supports dynamic scheduling of data patterns for shortened TTIs in accordance with aspects of the present disclosure.
Figure 3B:
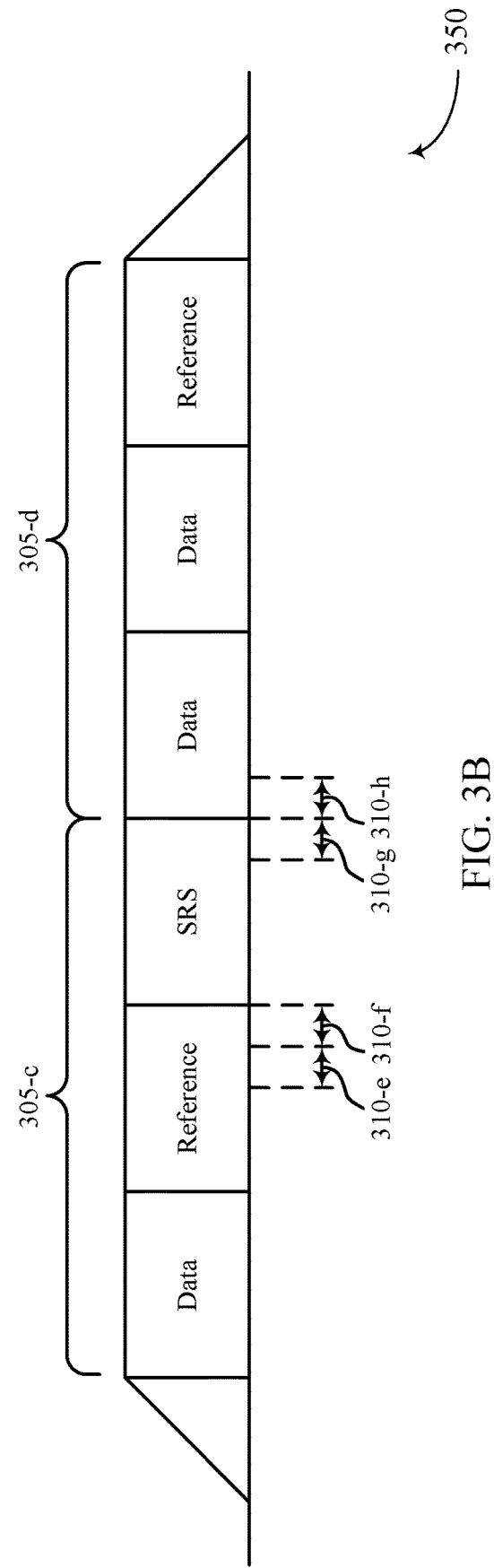

FIGS. 3A and 3B illustrate examples of a data pattern 300 and a data pattern 350, respectively, in a system that support dynamic scheduling of data patterns for sTTIs in accordance with various aspects of the present disclosure. In some examples, data pattern 300 and data pattern 350 may implement aspects of wireless communications system 100 and 200. Data patterns 300 and 350 may include two sTTIs 305 within each data pattern that each include three OFDM symbol periods 307. However, as described above, the sTTIs 305 have a different duration and likewise include a different number of symbol periods 307 (such as a slot TTI having seven symbol periods 307, etc.). sTTIs 305-a and 305-c may correspond to a temporally last TTI of a subframe (e.g., sTTI 5 as described with reference to FIG. 2 and Table 1) and sTTIs 305-b and 305-d may thus correspond to a temporally first TTI of a subsequent subframe (e.g., sTTI 0 as described with reference to FIG. 2 and Table 1). sTTIs 305 may include a combination of data signals, reference signals, and SRS. A base station 105 may choose between utilizing data pattern 300 or data pattern 350 based on the presence of SRS when scheduling uplink communications for a UE 115.

Data pattern 300 may illustrate a three-symbol sTTI 305-a with a pattern including respective symbol periods 307 for a reference signal, a first data signal, and a second data signal (i.e., "R D D", as described with respect to FIG. 2). The second data signal may be utilized for SRS. In some cases, the data pattern 300 may be associated with some level of degradation in data throughput of the transmission due to a transient region 310. Throughput degradation may be based on various factors, including data rate, modulation, transmission bandwidth, and the like. In data pattern 300, the SRS being preceded by a symbol period 307 including data may result in a configuration of transient region 310 (including transient regions 310-a and 310-b) within both data and SRS. Additionally, transient regions 310-c and 310-d may be configured for a subsequent data transmission, such that transient regions 310-c is overlaps with the SRS.

Alternatively, data pattern 350 may include a three symbol sTTI 305-c including a pattern of respective symbol periods comprising a data signal, a reference signal, and a second data signal (i.e., "D R D", as described with respect to FIG. 2), where the second data signal may be utilized for SRS. A UE 115 using data pattern 350 may allocate a transient region 310 (including transient regions 310-e and 310-f) within the reference symbol period with minimal or not overlap with the SRS. As such, data pattern 350 may experience a lower amount of throughput or signal degradation for sTTI 305-c in comparison to sTTI 305-a of data pattern 300. Data pattern 350 may include variations that each include a reference symbol period immediately preceding the SRS.

When scheduling uplink transmissions for a UE 115, the base station 105 may schedule data pattern 350 over data pattern 300 when SRS is to be transmitted by the UE 115. For example, if the base station 105 chooses data pattern 300, where a data signal precedes the SRS and transient regions 310-a and 310-b are distributed between the data signal and SRS, the transmission may experience a higher BLER and higher degradation (e.g., as compared to when a reference symbol precedes SRS). The data signal may have a relatively higher bandwidth and higher modulation than the reference signal, resulting in a higher degradation since a higher amount of signaling may be lost to the transient period allocated within the data signal (i.e., transient portion 310-a). Whereas if the base station 105 chooses data pattern 350 when scheduling uplink transmissions that include SRS, the reference signal transmission may immediately precede the SRS, and as a result of the majority of (or all of) transient region 310 being configured within the reference signal symbol period, the transmission may experience a lower throughput degradation (e.g., a BLER that is at least 1 dB lower) in comparison to data pattern 300. Additionally, because the reference signal is a known and predefined sequence, portions of the reference signal that may be lost to transient regions 310-e and 310-f may be recovered with some accuracy.

Figure 4:
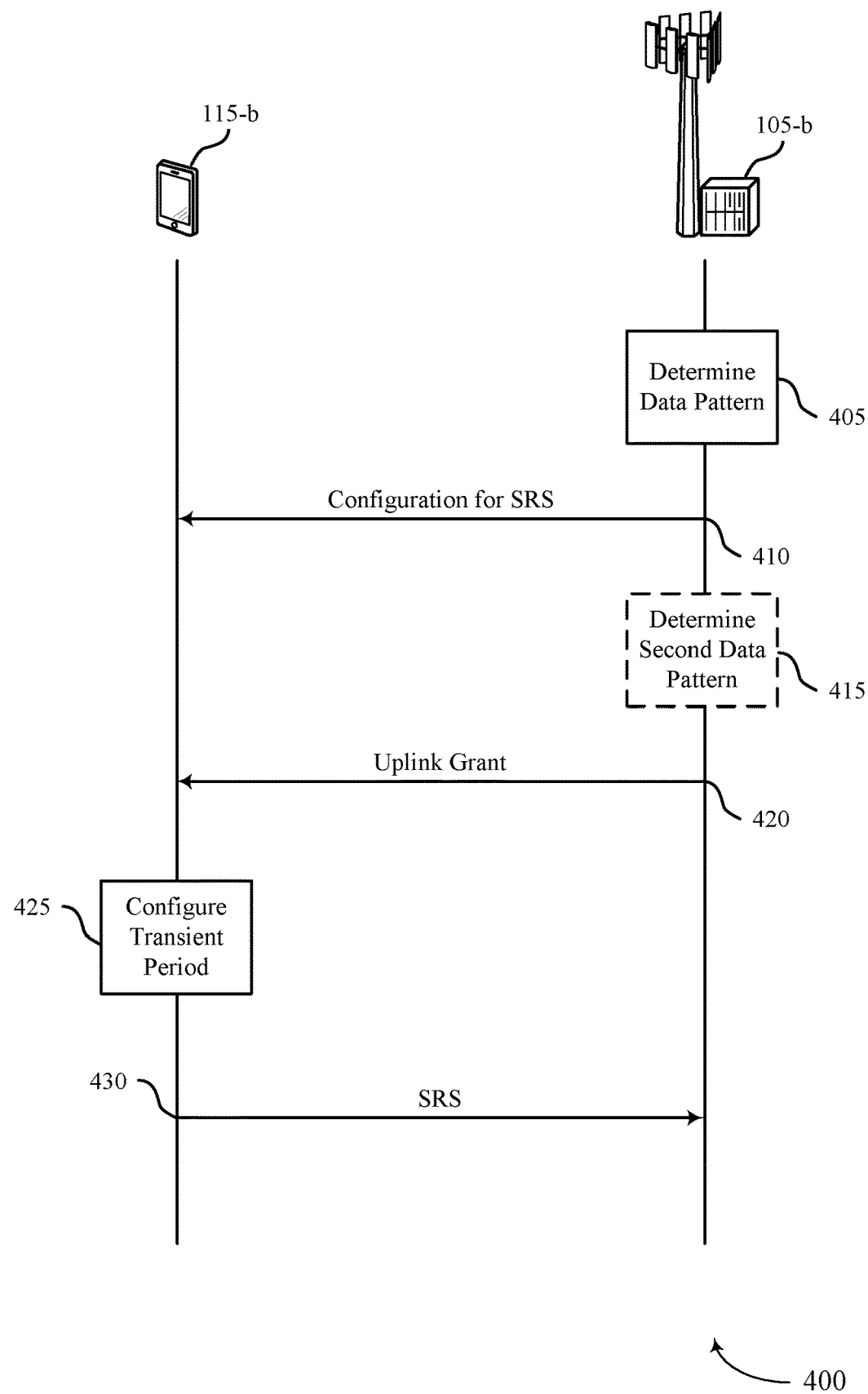
FIG. 4 illustrates an example of a process flow in a system that supports dynamic scheduling of data patterns for shortened TTIs in accordance with aspects of the present disclosure.

FIG. 4 illustrates an example of a process flow 400 in a system that supports dynamic scheduling of data patterns for sTTIs in accordance with various aspects of the present disclosure. In some examples, process flow 400 may implement aspects of wireless communications systems 100 and 200. For example, process flow 400 illustrates aspects of techniques performed by a base station 105-b and a UE 115-b, which may be examples of a base station 105 and a UE 115 as described with reference to FIGS. 1-3. In the following description of the process flow 400, the operations between the UE 115-b and base station 105-b may be performed in different orders or at different times. Certain operations may also be left out of the process flow 400, or other operations may be added to the process flow 400. Process flow 400 may illustrate an example of dynamic scheduling of data patterns based on the presence of SRS in uplink transmissions.

At 405, base station 105-b may determine a data pattern indicating a sequence of OFDM data symbol periods and OFDM reference symbol periods to span a plurality of TTIs in an uplink transmission. In such cases, a temporally last symbol period of the data pattern may be immediately preceded by a preceding reference symbol period. The temporally last symbol period and the preceding reference symbol period may be part of a three-symbol TTI. Additionally, a temporally first symbol period of the three-symbol TTI may be one of a data symbol period or a reference symbol period. In some cases, the three-symbol TTI includes a sTTI that has a first duration that is less than a second duration of a second TTI (e.g., a legacy TTI, a 1 ms TTI, a subframe, etc.).

In some examples, base station 105-b may configure UE 115-b to transmit a SRS, and UE 115-b may receive the configuration to transmit the SRS at 410. Base station 105-b may dynamically determine whether UE 115-b is to transmit the SRS. For instance, base station 105-b may determine whether UE 115-b will be transmitting SRS during the temporally last symbol period, and may determine a data pattern accordingly. In such cases, base station 105-b may schedule the uplink transmission having the data pattern based at least in part on the dynamic determination. For example, if SRS is to be transmitted, base station 105-b may schedule a "D R D" data pattern, as described with reference to FIG. 2, for the TTI during which SRS is transmitted such that SRS is immediately preceded by a reference symbol period. Alternatively, at 415, base station 105-b may optionally determine a second data pattern based at least in part on the dynamic determination, where the second data pattern indicates a second sequence of OFDM data symbol periods and OFDM reference symbol periods to span the plurality of TTIs in the uplink transmission, a temporally last symbol period of the second data pattern being immediately preceded by a preceding data symbol period. That is, if SRS is not transmitted during the TTI, then base station 105-b may schedule an "R D D" data pattern as described with reference to FIG. 2. Likewise, other data patterns may be used based on the determination by base station 105-b as to what information is to be transmitted during a given TTI (or during a given OFDM symbol period) by UE 115-b.

At 420, base station 105-b may transmit, in an uplink grant to UE 115-b, an indication of the determined data pattern. In some cases, UE 115-b may identify the data pattern based on the received indication. At 425, UE 115-b may configure a transient period preceding the SRS so that at least a majority of the transient period is within the preceding reference symbol period.

At 430, UE 115-b may transmit, to base station 105-b, the SRS during the temporally last symbol period of the uplink transmission and in accordance with the identified data pattern such that the SRS is immediately preceded by the preceding reference symbol period. Additionally, UE 115-b may transmit a reference signal during the preceding reference symbol period that includes the configured transient period. The reference signal may include a DMRS.

Figure 5:
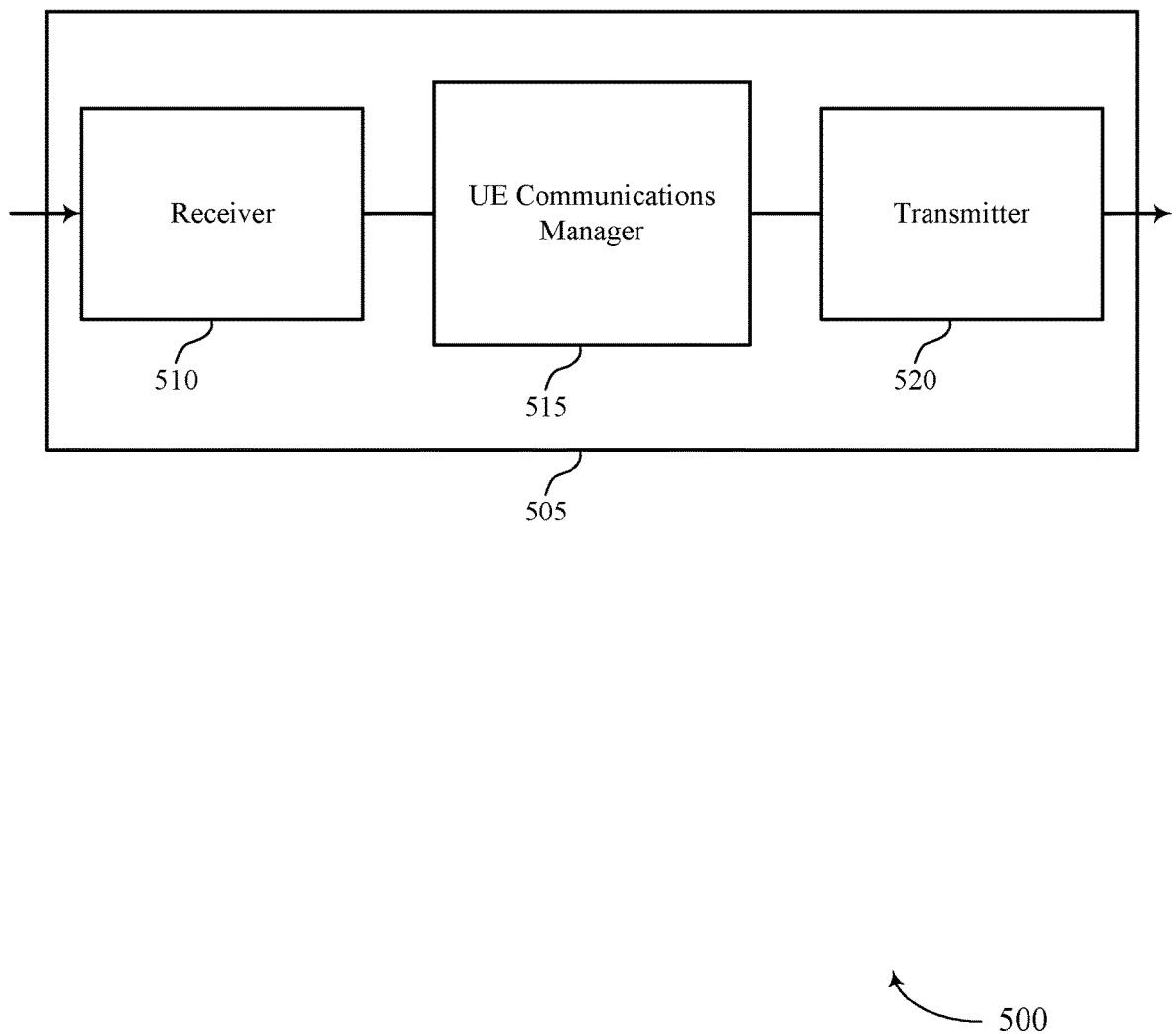
FIGS. 5 through 7 show block diagrams of a device that supports dynamic scheduling of data patterns for shortened TTIs in accordance with aspects of the present disclosure.

FIG. 5 shows a block diagram 500 of a wireless device 505 that supports dynamic scheduling of data patterns for shortened transmission time intervals in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to dynamic scheduling of data patterns for shortened transmission time intervals, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a data pattern indicating a sequence of OFDM data symbol periods and OFDM reference symbol periods to span a set of TTIs (e.g., sTTIs) in an uplink transmission, a temporally last symbol period of the data pattern being immediately preceded by a reference symbol period and receive a configuration to transmit a SRS. In some examples, UE communications manager 515 may transmit, to a base station 105, the SRS during the temporally last symbol period of the uplink transmission and in accordance with the identified data pattern such that the SRS is immediately preceded by the reference symbol period.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
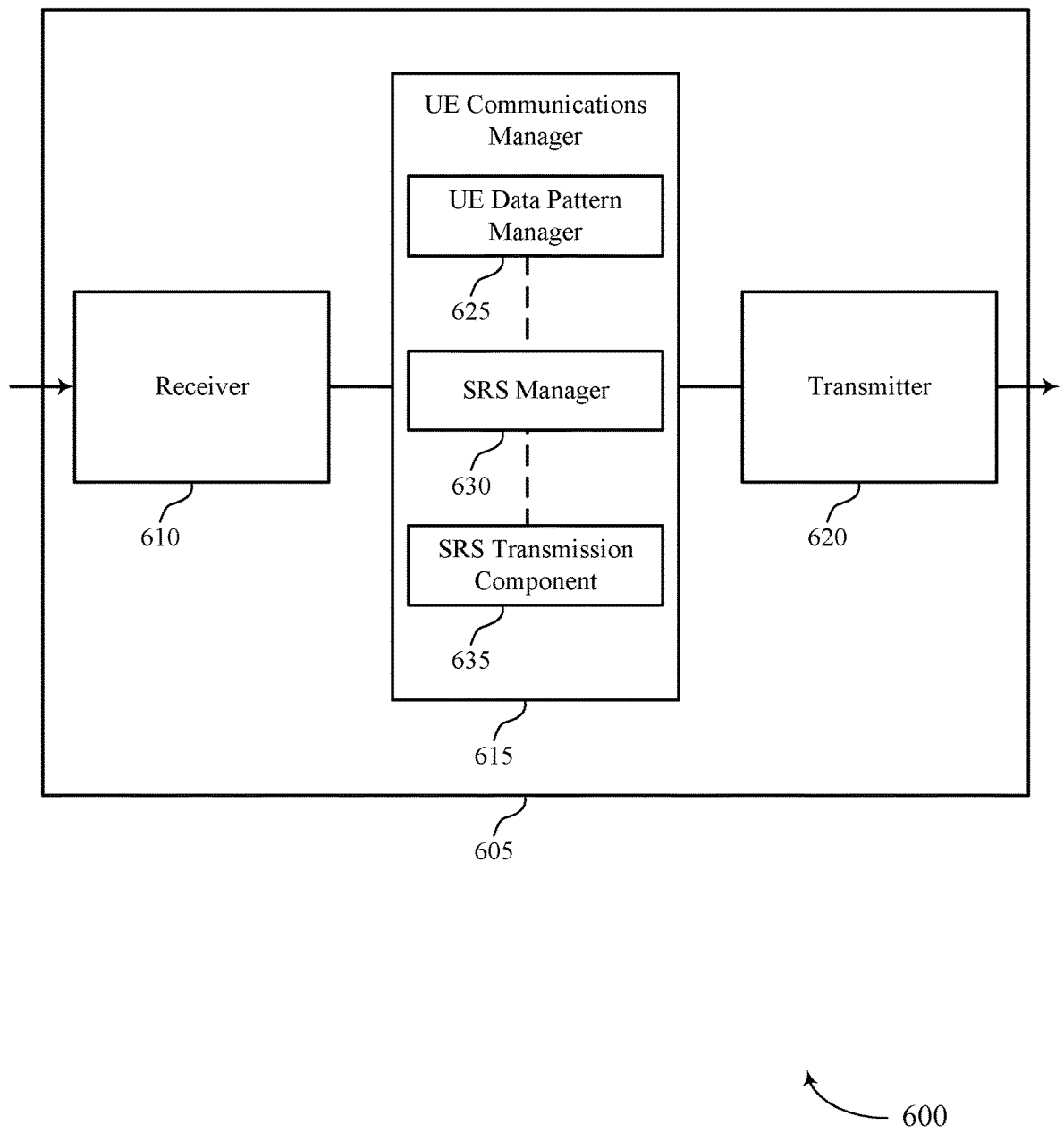

FIG. 6 shows a block diagram 600 of a wireless device 605 that supports dynamic scheduling of data patterns for shortened transmission time intervals in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to dynamic scheduling of data patterns for shortened transmission time intervals, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include UE data pattern manager 625, SRS manager 630, and SRS transmission component 635.

UE data pattern manager 625 may identify a data pattern indicating a sequence of OFDM data symbol periods and OFDM reference symbol periods to span a set of TTIs in an uplink transmission, a temporally last symbol period of the data pattern being immediately preceded by a reference symbol period. In some examples, UE data pattern manager 625 may receive, in an uplink grant from the base station 105, an indication of the data pattern, where identifying the data pattern is based on the received indication. In some cases, the temporally last symbol period and the preceding reference symbol period are part of a three-symbol TTI. In some cases, a temporally first symbol period of the three-symbol TTI is one of a data symbol period or a reference symbol period. In some cases, the three-symbol TTI includes a sTTI having a first duration that is less than a second duration of a second TTI (e.g., a 1 ms TTI).

SRS manager 630 may receive a configuration to transmit a SRS. SRS transmission component 635 may transmit, to a base station, the SRS during the temporally last symbol period of the uplink transmission and in accordance with the identified data pattern such that the SRS is immediately preceded by the reference symbol period.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
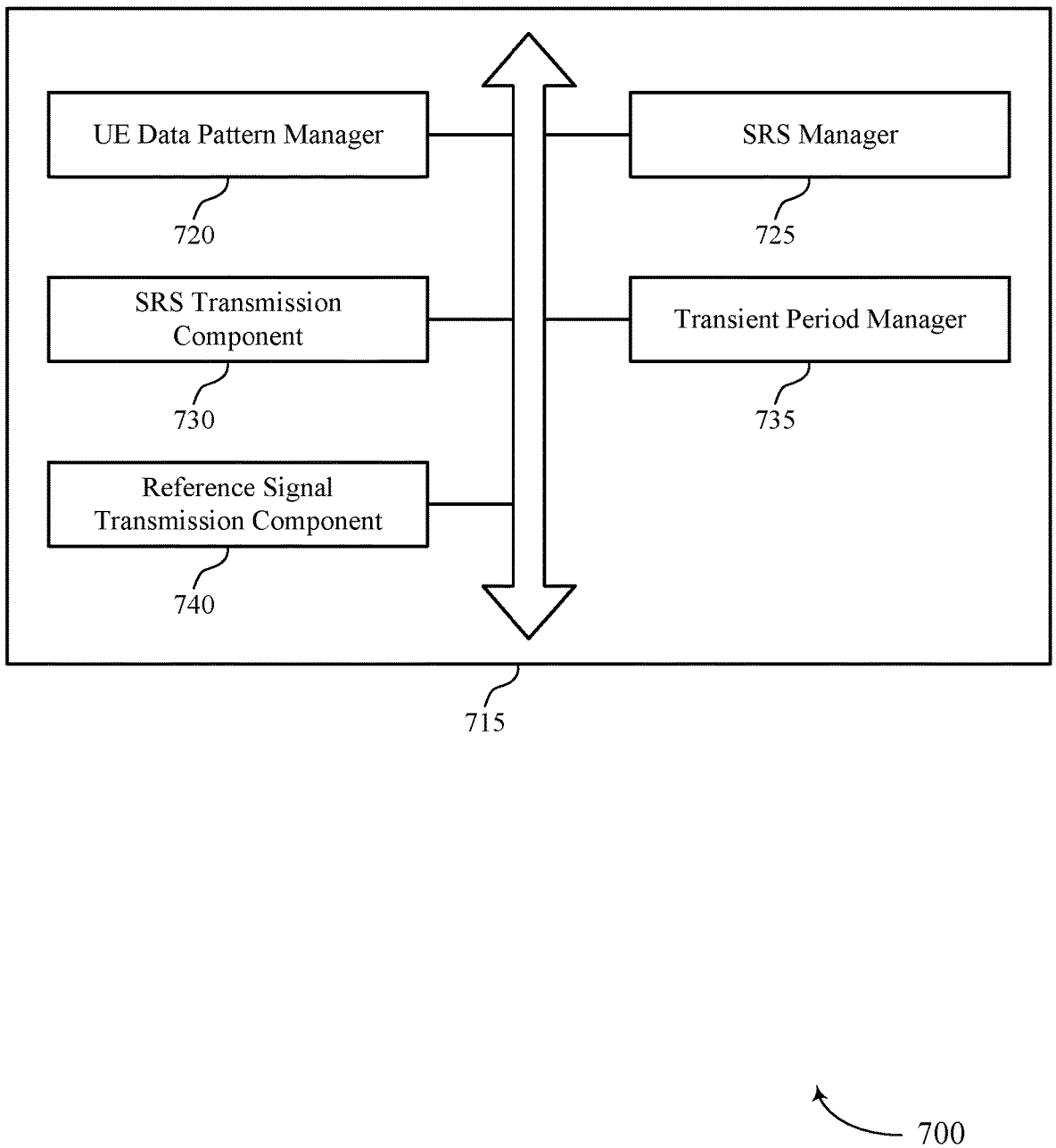

FIG. 7 shows a block diagram 700 of a UE communications manager 715 that supports dynamic scheduling of data patterns for shortened transmission time intervals in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include UE data pattern manager 720, SRS manager 725, SRS transmission component 730, transient period manager 735, and reference signal transmission component 740. Each of these modules may communicate, directly or indirectly, with one another (e.g., via one or more buses).

UE data pattern manager 720 may identify a data pattern indicating a sequence of OFDM data symbol periods and OFDM reference symbol periods to span a set of TTIs in an uplink transmission, a temporally last symbol period of the data pattern being immediately preceded by a reference symbol period. In some examples, UE data pattern manager 720 may receive, in an uplink grant from the base station 105, an indication of the data pattern, where identifying the data pattern is based on the received indication. In some cases, the temporally last symbol period and the preceding reference symbol period are part of a three-symbol TTI. In some cases, a temporally first symbol period of the three-symbol TTI is one of a data symbol period or a reference symbol period. In some cases, the three-symbol TTI includes a sTTI having a first duration that is less than a second duration of a second TTI.

SRS manager 725 may receive a configuration to transmit a SRS. SRS transmission component 730 may transmit, to the base station 105, the SRS during the temporally last symbol period of the uplink transmission and in accordance with the identified data pattern such that the SRS is immediately preceded by the reference symbol period. Transient period manager 735 may configure a transient period preceding the SRS so that at least a majority of the transient period is within the preceding reference symbol period. Reference signal transmission component 740 may transmit a reference signal during the preceding reference symbol period that includes the configured transient period. In some cases, the reference signal includes a DMRS.

Figure 8:
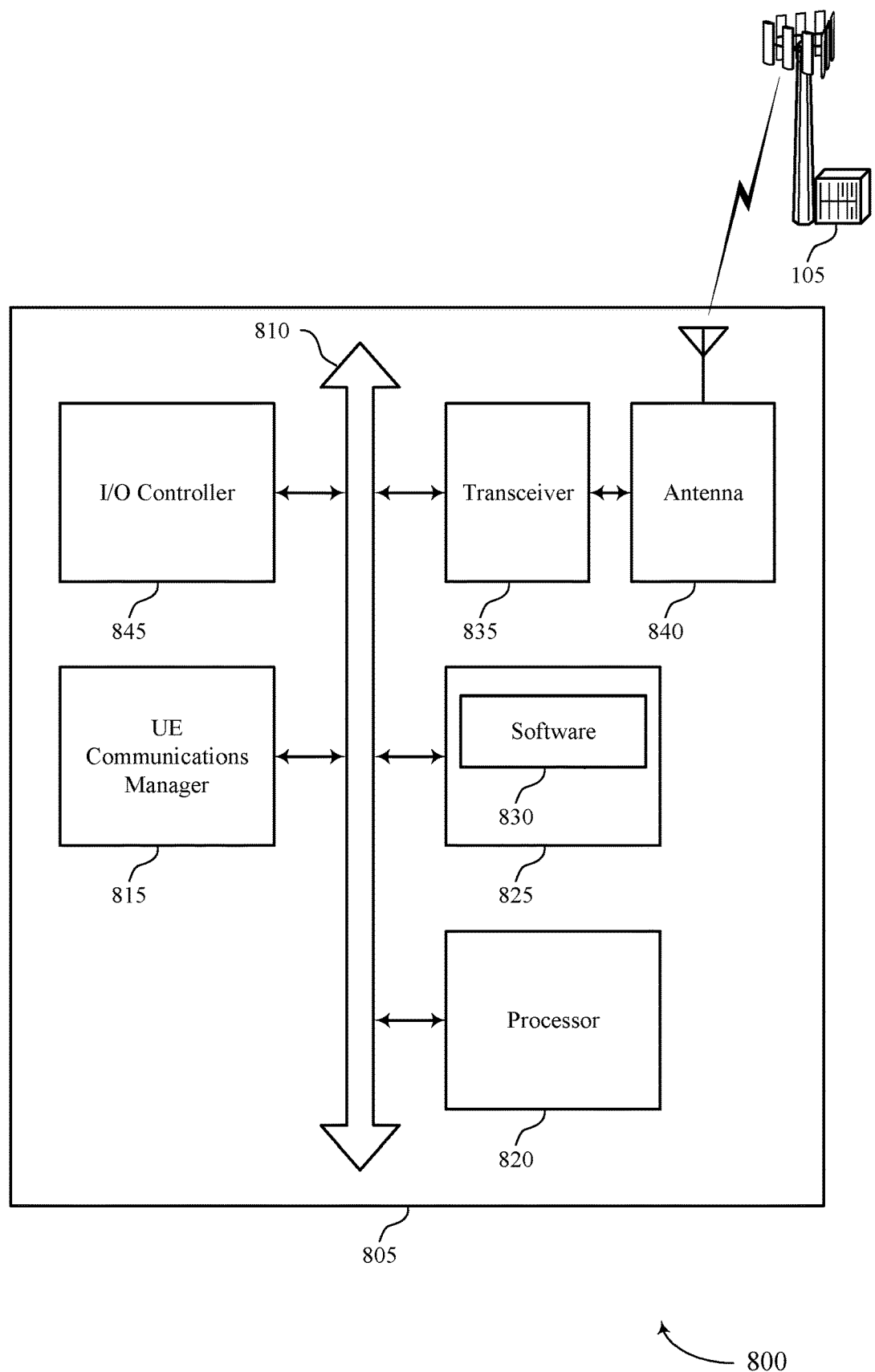
FIG. 8 illustrates a block diagram of a system including a user equipment (UE) that supports dynamic scheduling of data patterns for shortened TTIs in accordance with aspects of the present disclosure.

FIG. 8 shows a diagram of a system 800 including a device 805 that supports dynamic scheduling of data patterns for shortened transmission time intervals in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting dynamic scheduling of data patterns for shortened transmission time intervals).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support dynamic scheduling of data patterns for shortened transmission time intervals. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
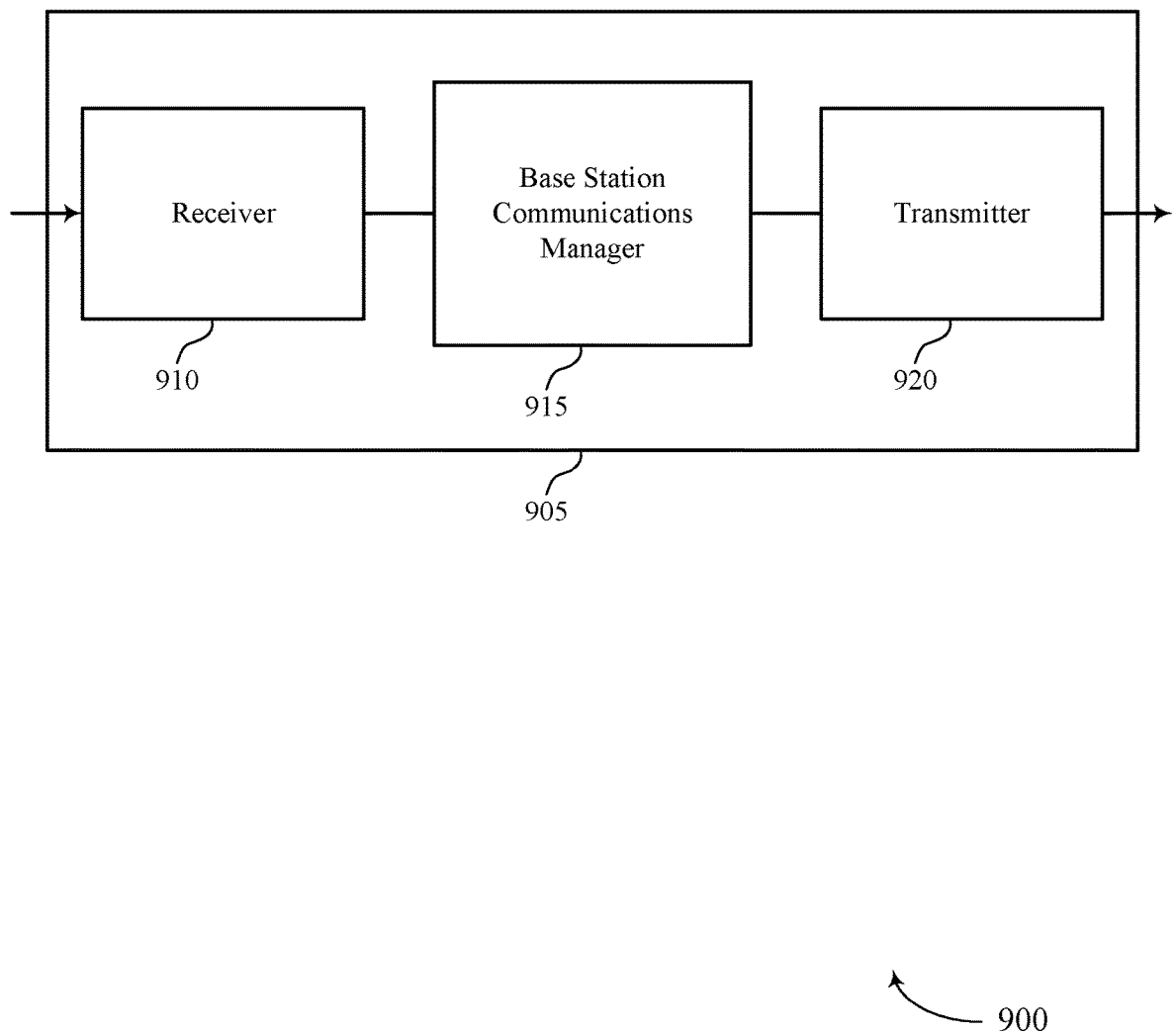
FIGS. 9 through 11 show block diagrams of a device that supports dynamic scheduling of data patterns for shortened TTIs in accordance with aspects of the present disclosure.

FIG. 9 shows a block diagram 900 of a wireless device 905 that supports dynamic scheduling of data patterns for shortened transmission time intervals in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to dynamic scheduling of data patterns for shortened transmission time intervals, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may determine a data pattern indicating a sequence of OFDM data symbol periods and OFDM reference symbol periods to span a set of TTIs in an uplink transmission, a temporally last symbol period of the data pattern being immediately preceded by a reference symbol period. In some cases, base station communications manager 915 may configure a UE 115 to transmit a SRS, and receive, from the UE 115, the SRS during the temporally last symbol period of the uplink transmission and in accordance with the identified data pattern such that the SRS is immediately preceded by the reference symbol period.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
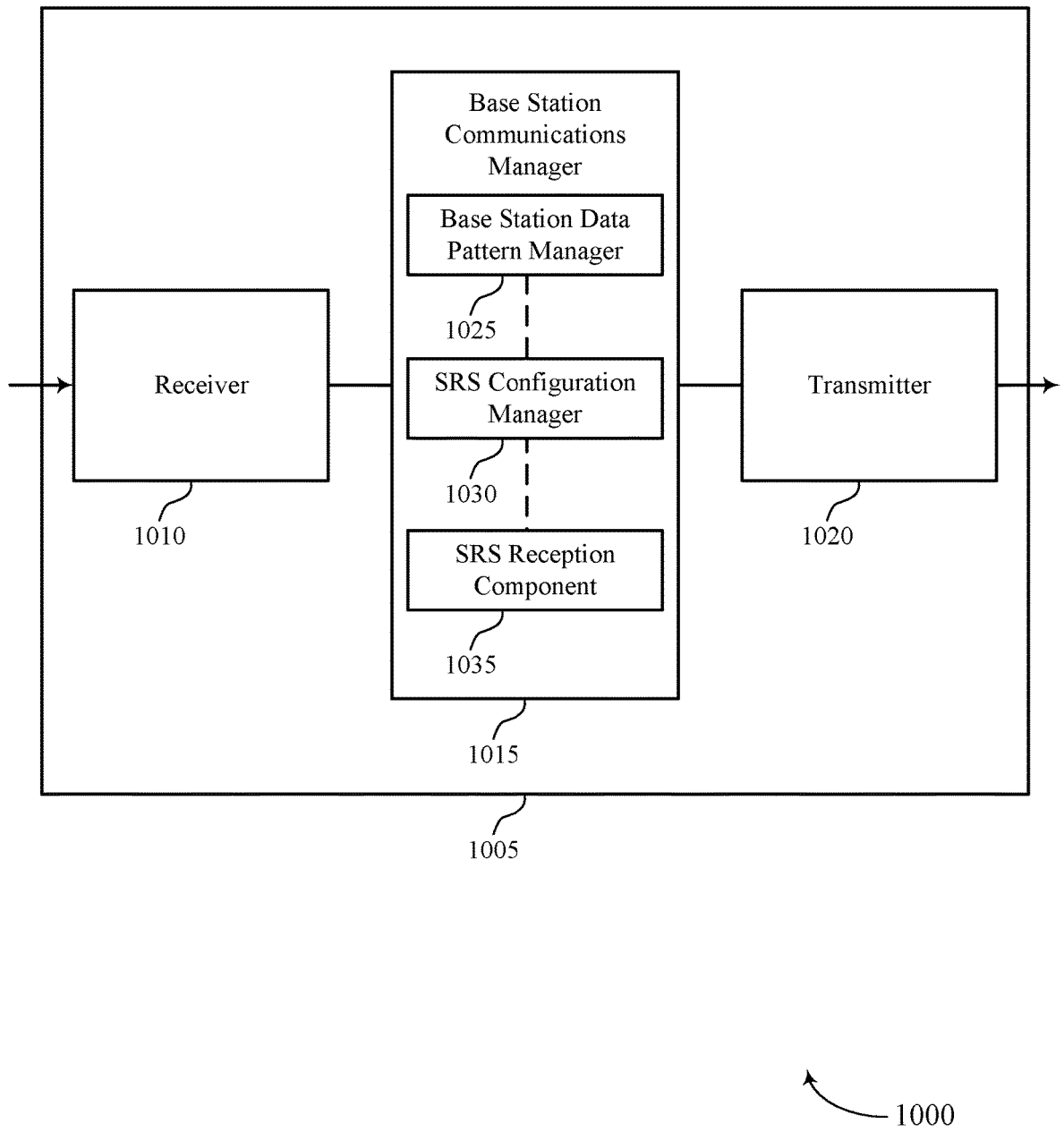

FIG. 10 shows a block diagram 1000 of a wireless device 1005 that supports dynamic scheduling of data patterns for shortened transmission time intervals in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to dynamic scheduling of data patterns for shortened transmission time intervals, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include base station data pattern manager 1025, SRS configuration manager 1030, and SRS reception component 1035.

Base station data pattern manager 1025 may determine a data pattern indicating a sequence of OFDM data symbol periods and OFDM reference symbol periods to span a set of TTIs in an uplink transmission, a temporally last symbol period of the data pattern being immediately preceded by a reference symbol period. In some cases, base station data pattern manager 1025 may dynamically determine whether the UE 115 is to transmit the SRS (e.g., during the temporally last symbol period). In some examples, base station data pattern manager 1025 may determine a second data pattern based on the dynamic determination, the second data pattern indicating a second sequence of OFDM data symbol periods and OFDM reference symbol periods to span the set of TTIs in the uplink transmission, a temporally last symbol period of the second data pattern being immediately preceded by a data symbol period. In some cases base station data pattern manager 1025 may transmit, in an uplink grant to the UE 115, an indication of the determined data pattern. In some cases, the temporally last symbol period and the preceding reference symbol period are part of a three-symbol TTI. In some cases, a temporally first symbol period of the three-symbol TTI is one of a data symbol period or a reference symbol period. In some cases, the three-symbol TTI includes a sTTI having a first duration that is less than a second duration of a second TTI.

SRS configuration manager 1030 may configure a UE to transmit a SRS. SRS reception component 1035 may receive, from the UE 115, the SRS during the temporally last symbol period of the uplink transmission and in accordance with the identified data pattern such that the SRS is immediately preceded by the reference symbol period.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
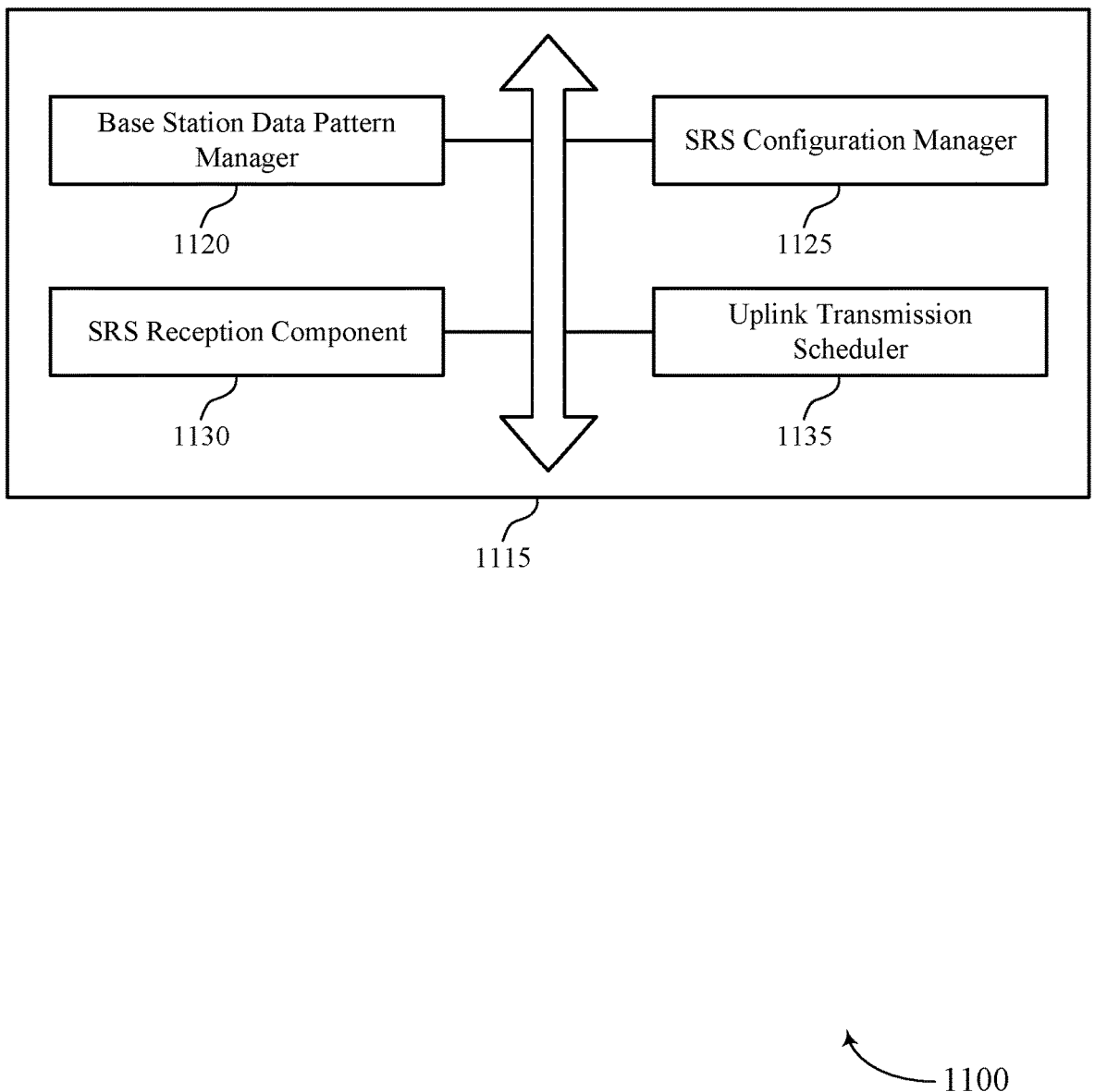

FIG. 11 shows a block diagram 1100 of a base station communications manager 1115 that supports dynamic scheduling of data patterns for shortened transmission time intervals in accordance with aspects of the present disclosure. The base station communications manager 1115 may be an example of aspects of a base station communications manager 1215 described with reference to FIGS. 9, 10, and 12. The base station communications manager 1115 may include base station data pattern manager 1120, SRS configuration manager 1125, SRS reception component 1130, and uplink transmission scheduler 1135. Each of these modules may communicate, directly or indirectly, with one another (e.g., via one or more buses).

Base station data pattern manager 1120 may determine a data pattern indicating a sequence of OFDM data symbol periods and OFDM reference symbol periods to span a set of TTIs in an uplink transmission, a temporally last symbol period of the data pattern being immediately preceded by a reference symbol period. In some cases, base station data pattern manager 1025 may dynamically determine whether the UE 115 is to transmit the SRS (e.g., during the temporally last symbol period). In some examples, base station data pattern manager 1025 may determine a second data pattern based on the dynamic determination, the second data pattern indicating a second sequence of OFDM data symbol periods and OFDM reference symbol periods to span the set of TTIs in the uplink transmission, a temporally last symbol period of the second data pattern being immediately preceded by a data symbol period. In some cases base station data pattern manager 1025 may transmit, in an uplink grant to the UE 115, an indication of the determined data pattern. In some cases, the temporally last symbol period and the preceding reference symbol period are part of a three-symbol TTI. In some cases, a temporally first symbol period of the three-symbol TTI is one of a data symbol period or a reference symbol period. In some cases, the three-symbol TTI includes a sTTI having a first duration that is less than a second duration of a second TTI.

SRS configuration manager 1125 may configure a UE 115 to transmit a SRS. SRS reception component 1130 may receive, from the UE 115, the SRS during the temporally last symbol period of the uplink transmission and in accordance with the identified data pattern such that the SRS is immediately preceded by the reference symbol period. Uplink transmission scheduler 1135 may schedule the uplink transmission having the data pattern based on the dynamic determination. Additionally or alternatively, uplink transmission scheduler 1135 may schedule a second uplink transmission having the second data pattern.

Figure 12:
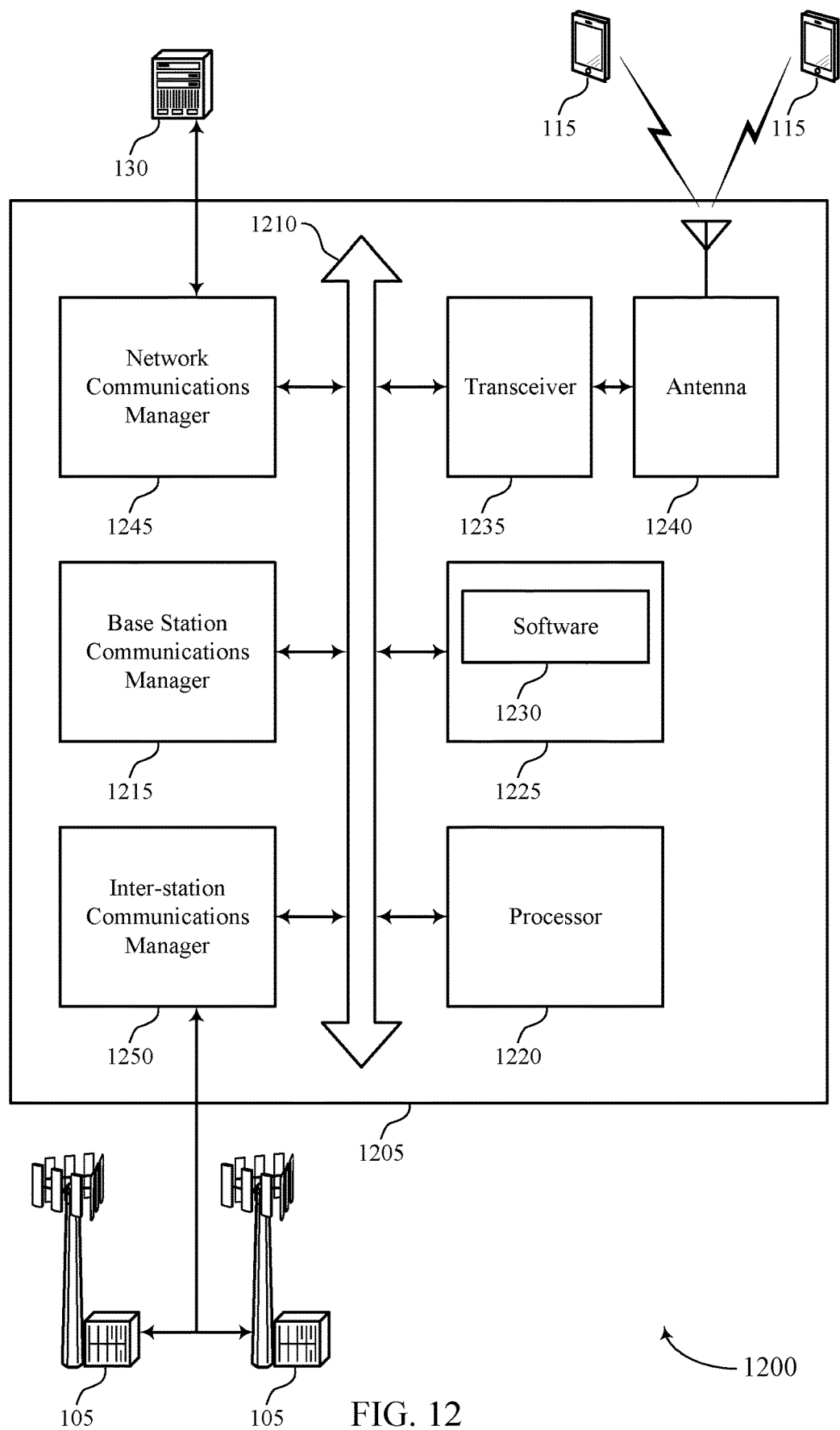
FIG. 12 illustrates a block diagram of a system including a base station that supports dynamic scheduling of data patterns for shortened TTIs in accordance with aspects of the present disclosure.

FIG. 12 shows a diagram of a system 1200 including a device 1205 that supports dynamic scheduling of data patterns for shortened transmission time intervals in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting dynamic scheduling of data patterns for shortened transmission time intervals).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support dynamic scheduling of data patterns for shortened transmission time intervals. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
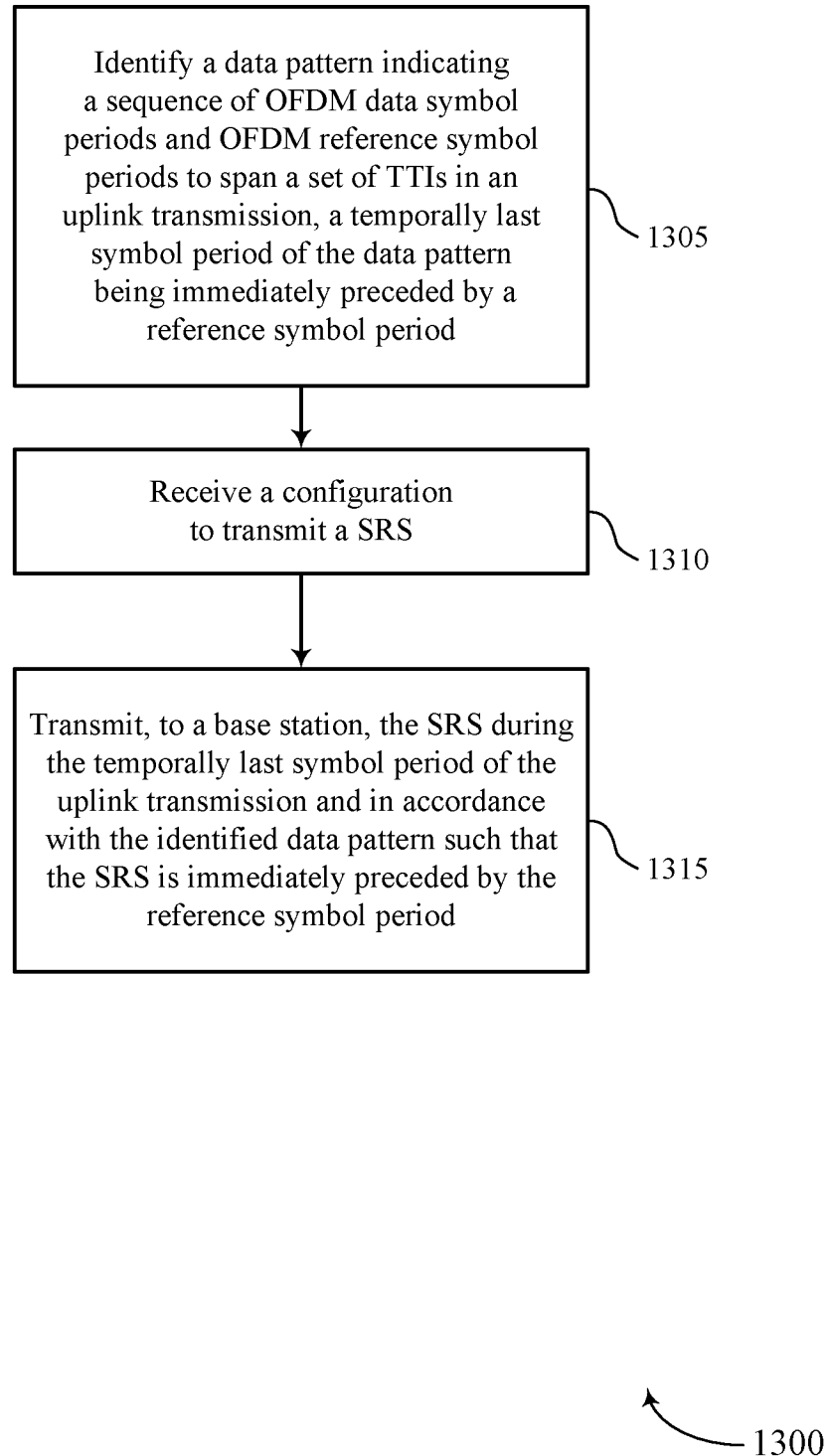
FIGS. 13 through 17 illustrate methods for dynamic scheduling of data patterns for shortened TTIs in accordance with aspects of the present disclosure.

FIG. 13 shows a flowchart illustrating a method 1300 for dynamic scheduling of data patterns for shortened transmission time intervals in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a data pattern indicating a sequence of OFDM data symbol periods and OFDM reference symbol periods to span a plurality of TTIs in an uplink transmission, a temporally last symbol period of the data pattern being immediately preceded by a reference symbol period. The operations of block 1305 may be performed according to the methods described herein. In certain examples, aspects of the operations of block 1305 may be performed by a UE data pattern manager as described with reference to FIGS. 5 through 8.

At block 1310 the UE 115 may receive a configuration to transmit a SRS. The operations of block 1310 may be performed according to the methods described herein. In certain examples, aspects of the operations of block 1310 may be performed by a SRS manager as described with reference to FIGS. 5 through 8.

At block 1315 the UE 115 may transmit, to a base station, the SRS during the temporally last symbol period of the uplink transmission and in accordance with the identified data pattern such that the SRS is immediately preceded by the reference symbol period. The operations of block 1315 may be performed according to the methods described herein. In certain examples, aspects of the operations of block 1315 may be performed by a SRS transmission component as described with reference to FIGS. 5 through 8.

Figure 14:
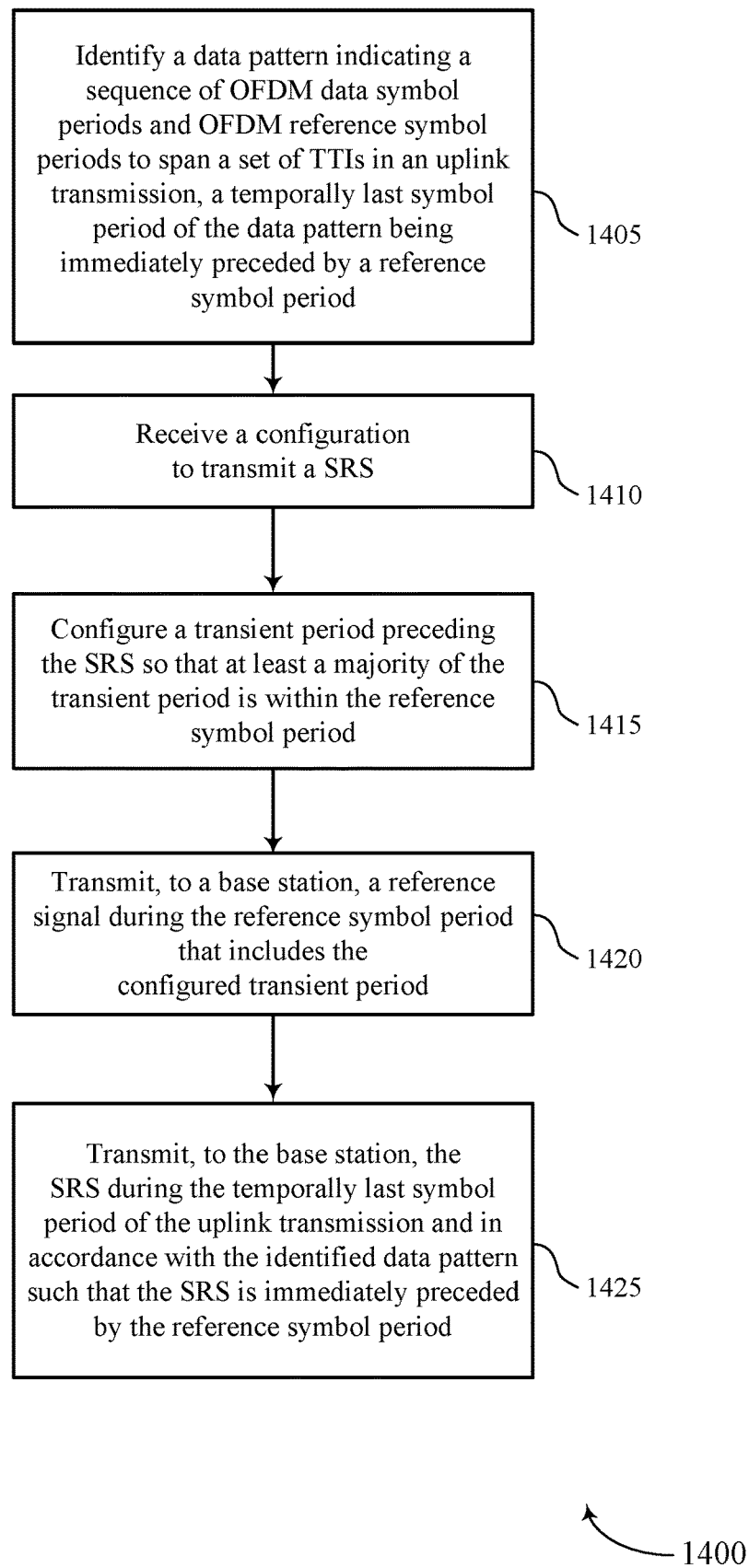

FIG. 14 shows a flowchart illustrating a method 1400 for dynamic scheduling of data patterns for shortened transmission time intervals in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify a data pattern indicating a sequence of OFDM data symbol periods and OFDM reference symbol periods to span a plurality of TTIs in an uplink transmission, a temporally last symbol period of the data pattern being immediately preceded by a reference symbol period. The operations of block 1405 may be performed according to the methods described herein. In certain examples, aspects of the operations of block 1405 may be performed by a UE data pattern manager as described with reference to FIGS. 5 through 8.

At block 1410 the UE 115 may receive a configuration to transmit a SRS. The operations of block 1410 may be performed according to the methods described herein. In certain examples, aspects of the operations of block 1410 may be performed by a SRS manager as described with reference to FIGS. 5 through 8.

At block 1415 the UE 115 may configure a transient period preceding the SRS so that at least a majority of the transient period is within the reference symbol period. The operations of block 1415 may be performed according to the methods described herein. In certain examples, aspects of the operations of block 1415 may be performed by a transient period manager as described with reference to FIGS. 5 through 8.

At block 1420 the UE 115 may transmit, to a base station 105, a reference signal during the reference symbol period that includes the configured transient period. The operations of block 1420 may be performed according to the methods described herein. In certain examples, aspects of the operations of block 1420 may be performed by a reference signal transmission component as described with reference to FIGS. 5 through 8.

At block 1425 the UE 115 may transmit, to the base station 105, the SRS during the temporally last symbol period of the uplink transmission and in accordance with the identified data pattern such that the SRS is immediately preceded by the reference symbol period. The operations of block 1425 may be performed according to the methods described herein. In certain examples, aspects of the operations of block 1425 may be performed by a SRS transmission component as described with reference to FIGS. 5 through 8.

Figure 15:
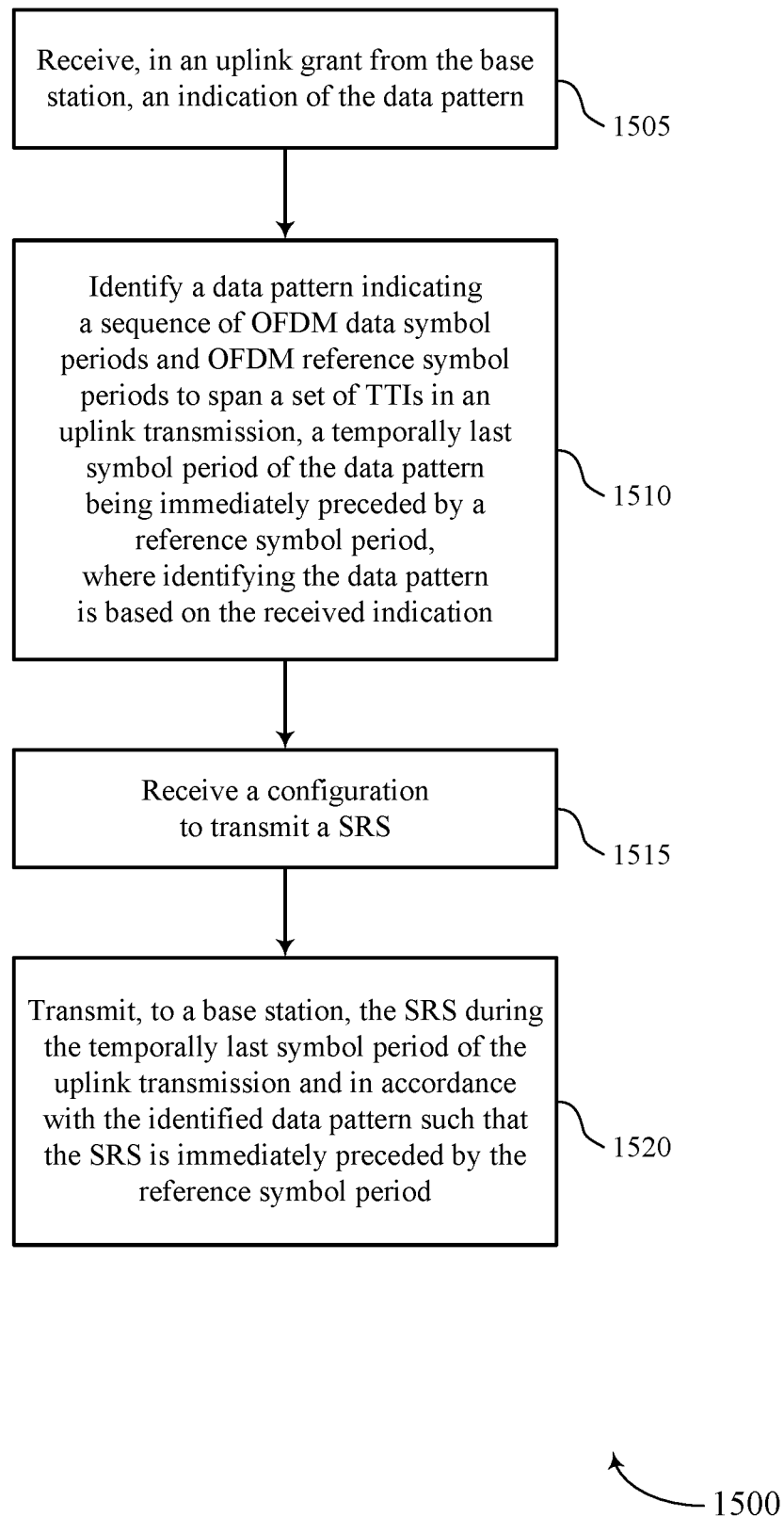

FIG. 15 shows a flowchart illustrating a method 1500 for dynamic scheduling of data patterns for shortened transmission time intervals in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive, in an uplink grant from the base station, an indication of the data pattern. The operations of block 1505 may be performed according to the methods described herein. In certain examples, aspects of the operations of block 1505 may be performed by a UE data pattern manager as described with reference to FIGS. 5 through 8.

At block 1510 the UE 115 may identify a data pattern indicating a sequence of OFDM data symbol periods and OFDM reference symbol periods to span a plurality of TTIs in an uplink transmission, a temporally last symbol period of the data pattern being immediately preceded by a reference symbol period, wherein identifying the data pattern is based on the received indication. The operations of block 1510 may be performed according to the methods described herein. In certain examples, aspects of the operations of block 1510 may be performed by a UE data pattern manager as described with reference to FIGS. 5 through 8.

At block 1515 the UE 115 may receive a configuration to transmit a SRS. The operations of block 1515 may be performed according to the methods described herein. In certain examples, aspects of the operations of block 1515 may be performed by a SRS manager as described with reference to FIGS. 5 through 8.

At block 1520 the UE 115 may transmit, to a base station, the SRS during the temporally last symbol period of the uplink transmission and in accordance with the identified data pattern such that the SRS is immediately preceded by the reference symbol period. The operations of block 1520 may be performed according to the methods described herein. In certain examples, aspects of the operations of block 1520 may be performed by a SRS transmission component as described with reference to FIGS. 5 through 8.

Figure 16:
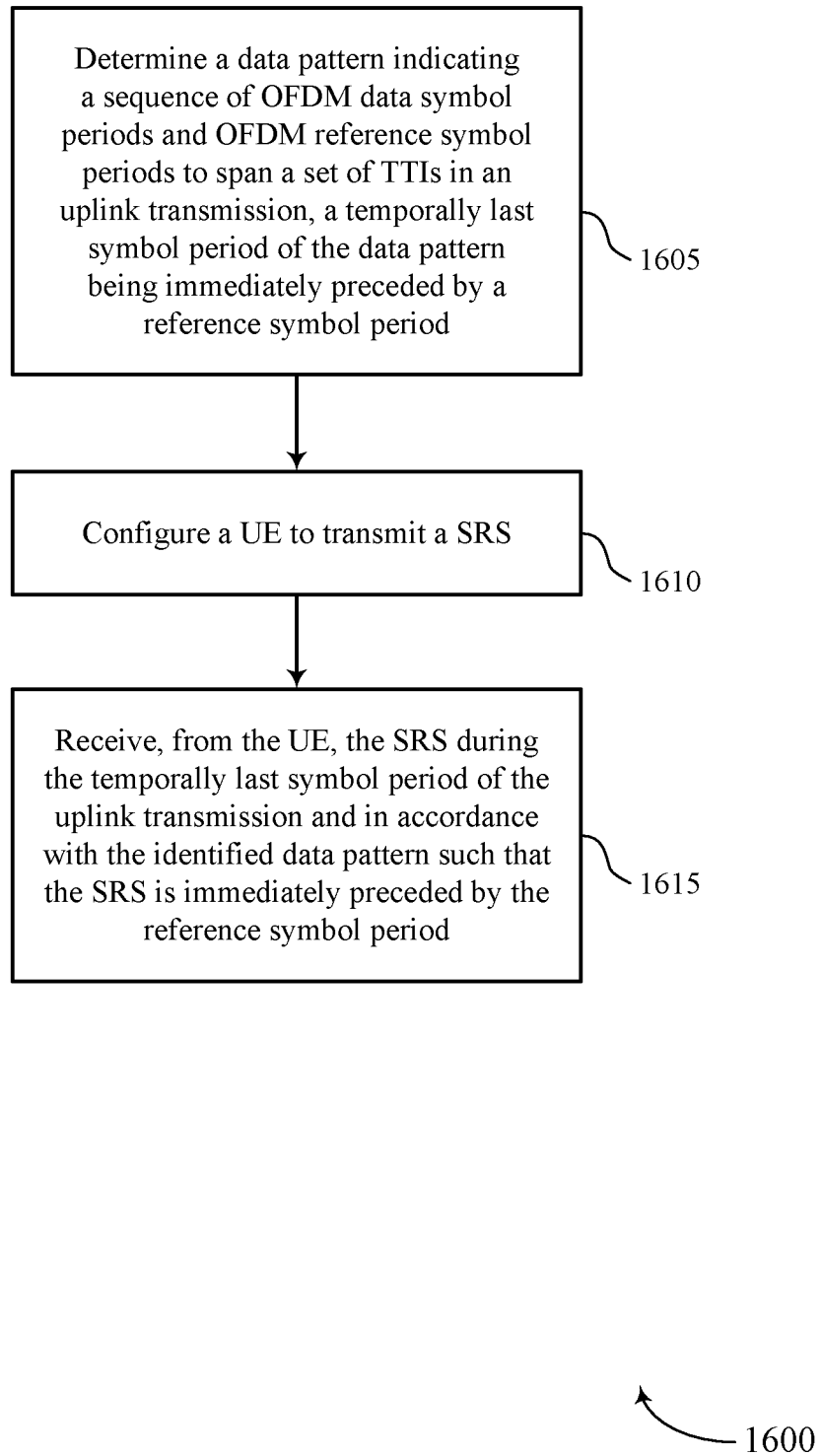

FIG. 16 shows a flowchart illustrating a method 1600 for dynamic scheduling of data patterns for shortened transmission time intervals in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may determine a data pattern indicating a sequence of OFDM data symbol periods and OFDM reference symbol periods to span a plurality of TTIs in an uplink transmission, a temporally last symbol period of the data pattern being immediately preceded by a reference symbol period. The operations of block 1605 may be performed according to the methods described herein. In certain examples, aspects of the operations of block 1605 may be performed by a base station data pattern manager as described with reference to FIGS. 9 through 12.

At block 1610 the base station 105 may configure a UE 115 to transmit a SRS. The operations of block 1610 may be performed according to the methods described herein. In certain examples, aspects of the operations of block 1610 may be performed by a SRS configuration manager as described with reference to FIGS. 9 through 12.

At block 1615 the base station 105 may receive, from the UE 115, the SRS during the temporally last symbol period of the uplink transmission and in accordance with the identified data pattern such that the SRS is immediately preceded by the reference symbol period. The operations of block 1615 may be performed according to the methods described herein. In certain examples, aspects of the operations of block 1615 may be performed by a SRS reception component as described with reference to FIGS. 9 through 12.

Figure 17:
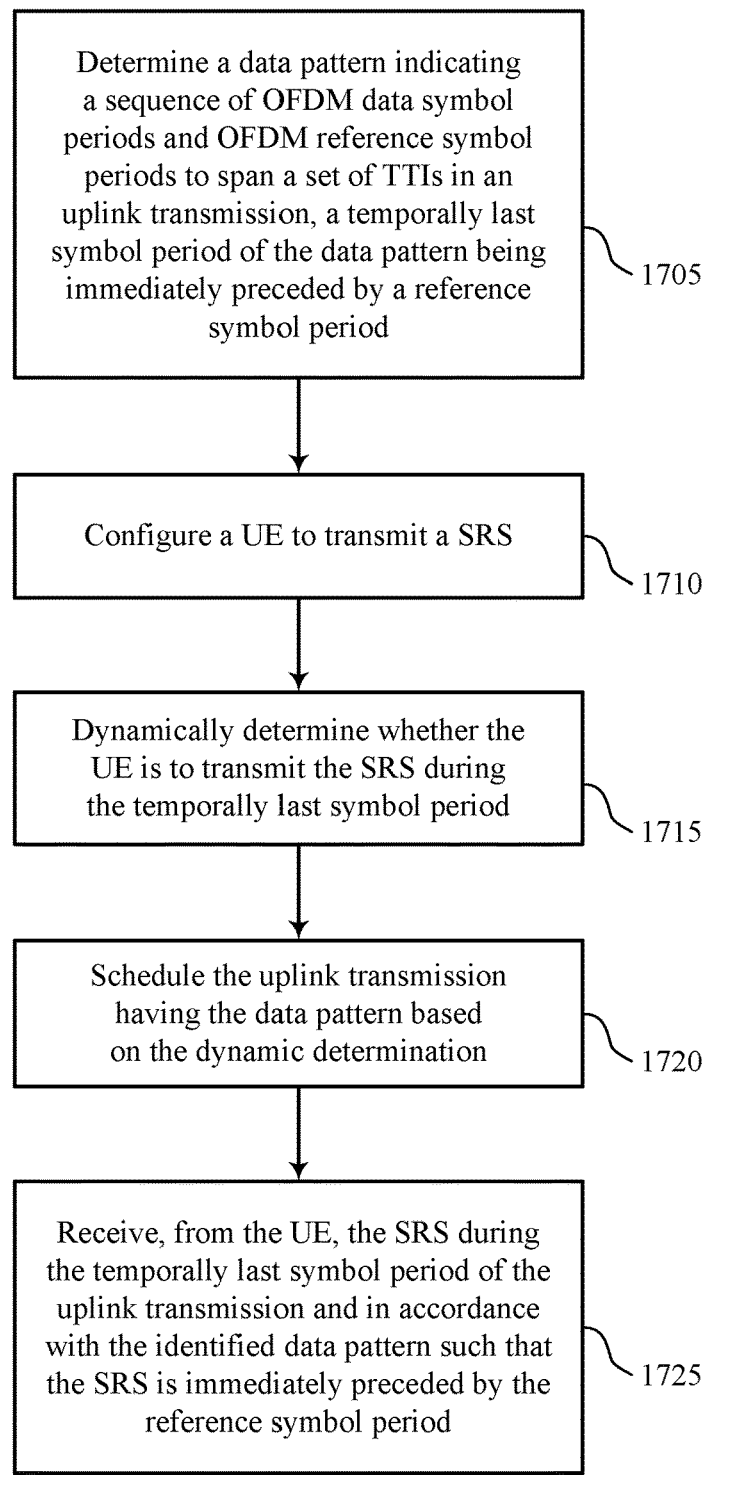

FIG. 17 shows a flowchart illustrating a method 1700 for dynamic scheduling of data patterns for shortened transmission time intervals in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may determine a data pattern indicating a sequence of OFDM data symbol periods and OFDM reference symbol periods to span a plurality of TTIs in an uplink transmission, a temporally last symbol period of the data pattern being immediately preceded by a reference symbol period. The operations of block 1705 may be performed according to the methods described herein. In certain examples, aspects of the operations of block 1705 may be performed by a base station data pattern manager as described with reference to FIGS. 9 through 12.

At block 1710 the base station 105 may configure a user equipment (UE) to transmit a SRS. The operations of block 1710 may be performed according to the methods described herein. In certain examples, aspects of the operations of block 1710 may be performed by a SRS configuration manager as described with reference to FIGS. 9 through 12.

At block 1715 the base station 105 may dynamically determine whether the UE 115 is to transmit the SRS during the temporally last symbol period. The operations of block 1715 may be performed according to the methods described herein. In certain examples, aspects of the operations of block 1715 may be performed by a base station data pattern manager as described with reference to FIGS. 9 through 12.

At block 1720 the base station 105 may schedule the uplink transmission having the data pattern based at least in part on the dynamic determination. The operations of block 1720 may be performed according to the methods described herein. In certain examples, aspects of the operations of block 1720 may be performed by a uplink transmission scheduler as described with reference to FIGS. 9 through 12.

At block 1725 the base station 105 may receive, from the UE, the SRS during the temporally last symbol period of the uplink transmission and in accordance with the identified data pattern such that the SRS is immediately preceded by the reference symbol period. The operations of block 1725 may be performed according to the methods described herein. In certain examples, aspects of the operations of block 1725 may be performed by a SRS reception component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random access memory (RAM), read only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a data pattern indicating a sequence of orthogonal frequency-division multiplexing (OFDM) data symbol periods and OFDM reference symbol periods to span a plurality of transmission time intervals (TTIs) in an uplink transmission, a temporally last symbol period of the data pattern being immediately preceded by a reference symbol period;
receiving a configuration to transmit a sounding reference signal (SRS); and
transmitting, to a base station, the SRS during the temporally last symbol period of the uplink transmission and in accordance with the identified data pattern such that the SRS is immediately preceded by the reference symbol period.

2. The method of claim 1, further comprising:
configuring a transient period preceding the SRS so that at least a majority of the transient period is within the reference symbol period; and
transmitting a reference signal during the reference symbol period that includes the configured transient period.

3. The method of claim 2, wherein the reference signal comprises a demodulation reference signal (DMRS).

4. The method of claim 1, further comprising:
receiving, in an uplink grant from the base station, an indication of the data pattern, wherein identifying the data pattern is based on the received indication.

5. The method of claim 1, wherein the temporally last symbol period and the reference symbol period are part of a three-symbol TTI.

6. The method of claim 5, wherein a temporally first symbol period of the three-symbol TTI is one of a data symbol period or a reference symbol period.

7. The method of claim 5, wherein the three-symbol TTI is a short TTI (sTTI) having a first duration that is less than a second duration of a second TTI.

8. The method of claim 5, wherein the three-symbol TTI is an sTTI5 in a fourteen-symbol data pattern.

9. A method for wireless communication, comprising:
determining a data pattern indicating a sequence of orthogonal frequency-division multiplexing (OFDM) data symbol periods and OFDM reference symbol periods to span a plurality of transmission time intervals (TTIs) in an uplink transmission, a temporally last symbol period of the data pattern being immediately preceded by a reference symbol period;
configuring a user equipment (UE) to transmit a sounding reference signal (SRS); and
receiving, from the UE, the SRS during the temporally last symbol period of the uplink transmission and in accordance with the identified data pattern such that the SRS is immediately preceded by the reference symbol period.

10. The method of claim 9, further comprising:
dynamically determining whether the UE is to transmit the SRS; and
scheduling the uplink transmission having the data pattern based at least in part on the dynamic determination.

11. The method of claim 10, further comprising:
determining a second data pattern based at least in part on the dynamic determination, the second data pattern indicating a second sequence of OFDM data symbol periods and OFDM reference symbol periods to span the plurality of TTIs in the uplink transmission, a temporally last symbol period of the second data pattern being immediately preceded by a data symbol period; and
scheduling a second uplink transmission having the second data pattern.

12. The method of claim 9, further comprising:
transmitting, in an uplink grant to the UE, an indication of the determined data pattern.

13. The method of claim 9, wherein the temporally last symbol period and the reference symbol period are part of a three-symbol TTI.

14. The method of claim 13, wherein a temporally first symbol period of the three-symbol TTI is one of a data symbol period or a reference symbol period.

15. The method of claim 13, wherein the three-symbol TTI is a short TTI (sTTI) having a first duration that is less than a second duration of a second TTI.

16. The method of claim 13, wherein the three-symbol TTI is an sTTI5 in a fourteen-symbol data pattern.

17. An apparatus for wireless communication, comprising:
a processor;
memory in electronic communication with the processor; and
instructions stored in the memory and operable, when executed by the processor, to cause the apparatus to:
identify a data pattern indicating a sequence of orthogonal frequency-division multiplexing (OFDM) data symbol periods and OFDM reference symbol periods to span a plurality of transmission time intervals (TTIs) in an uplink transmission, a temporally last symbol period of the data pattern being immediately preceded by a reference symbol period;
receive a configuration to transmit a sounding reference signal (SRS); and
transmit, to a base station, the SRS during the temporally last symbol period of the uplink transmission and in accordance with the identified data pattern such that the SRS is immediately preceded by the reference symbol period.

18. The apparatus of claim 17, wherein the instructions are further executable by the processor to cause the apparatus to:
configure a transient period preceding the SRS so that at least a majority of the transient period is within the reference symbol period; and
transmit a reference signal during the reference symbol period that includes the configured transient period.

19. The apparatus of claim 18, wherein the reference signal comprises a demodulation reference signal (DMRS).

20. The apparatus of claim 17, wherein the instructions are further executable by the processor to cause the apparatus to:
receive, in an uplink grant from the base station, an indication of the data pattern, wherein identifying the data pattern is based on the received indication.

21. The apparatus of claim 17, wherein the temporally last symbol period and the reference symbol period are part of a three-symbol TTI.

22. The apparatus of claim 21, wherein a temporally first symbol period of the three-symbol TTI is one of a data symbol period or a reference symbol period.

23. The apparatus of claim 21, wherein the three-symbol TTI is a short TTI (sTTI) having a first duration that is less than a second duration of a second TTI.

24. An apparatus for wireless communication, comprising:
a processor;
memory in electronic communication with the processor; and
instructions stored in the memory and operable, when executed by the processor, to cause the apparatus to:
determine a data pattern indicating a sequence of orthogonal frequency-division multiplexing (OFDM) data symbol periods and OFDM reference symbol periods to span a plurality of transmission time intervals (TTIs) in an uplink transmission, a temporally last symbol period of the data pattern being immediately preceded by a reference symbol period;
configure a user equipment (UE) to transmit a sounding reference signal (SRS); and
receive, from the UE, the SRS during the temporally last symbol period of the uplink transmission and in accordance with the identified data pattern such that the SRS is immediately preceded by the reference symbol period.

25. The apparatus of claim 24, wherein the instructions are further executable by the processor to cause the apparatus to:
dynamically determine whether the UE is to transmit the SRS; and
schedule the uplink transmission having the data pattern based at least in part on the dynamic determination.

26. The apparatus of claim 25, wherein the instructions are further executable by the processor to cause the apparatus to:
determine a second data pattern based at least in part on the dynamic determination, the second data pattern indicating a second sequence of OFDM data symbol periods and OFDM reference symbol periods to span the plurality of TTIs in the uplink transmission, a temporally last symbol period of the second data pattern being immediately preceded by a data symbol period; and
schedule a second uplink transmission having the second data pattern.

27. The apparatus of claim 24, wherein the instructions are further executable by the processor to cause the apparatus to:
transmit, in an uplink grant to the UE, an indication of the determined data pattern.

28. The apparatus of claim 24, wherein the temporally last symbol period and the reference symbol period are part of a three-symbol TTI.

29. The apparatus of claim 28, wherein a temporally first symbol period of the three-symbol TTI is one of a data symbol period or a reference symbol period.

30. The apparatus of claim 28, wherein the three-symbol TTI is a short TTI (sTTI) having a first duration that is less than a second duration of a second TTI.

* * * * *